US012288268B2

(12) United States Patent
Shao et al.

(10) Patent No.: US 12,288,268 B2
(45) **Date of Patent: *Apr. 29, 2025**

(54) METHOD, INTERNET OF THINGS SYSTEM, AND STORAGE MEDIUM FOR DETERMINING GAS COMPENSATION SCHEME BASED ON SMART GAS

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/908,758

(22) Filed: Oct. 7, 2024

(65) Prior Publication Data

US 2025/0029191 A1 Jan. 23, 2025

Related U.S. Application Data

(63) Continuation of application No. 18/497,987, filed on Oct. 30, 2023, now Pat. No. 12,148,054.

(30) Foreign Application Priority Data

Sep. 20, 2023 (CN) ........................ 202311214929.X

(51) Int. Cl.
*G06Q 50/06* (2024.01)

(52) U.S. Cl.
CPC .................................... *G06Q 50/06* (2013.01)

(58) Field of Classification Search
None
See application file for complete search history.

(56) References Cited

U.S. PATENT DOCUMENTS 9,890,908 B1 * 2/2018 Esmaili ..................... F17D 1/04
9,915,399 B1 3/2018 Latshaw et al.

FOREIGN PATENT DOCUMENTS

CN 104123591 A 10/2014
CN 107169633 A 9/2017
(Continued)

OTHER PUBLICATIONS

Wan et al.; "Research on Forecasting Method of Natural Gas Demand Based on GM (1,1) Model and Markov Chain"; Oct. 16, 2014; IEEE; pp. 436-441 (Year: 2014).*
(Continued)

*Primary Examiner* — Omar Zeroual
*Assistant Examiner* — Jorge G Del Toro-Ortega
(74) *Attorney, Agent, or Firm* — METIS IP LLC

(57) ABSTRACT

A method and an Internet of Things system for determining a gas compensation scheme based on smart gas are provided. The method includes: determining, based on a planned gas supply quantity of a gas supplier, a predicted gas supply quantity for a future preset time period; predicting a gas demand quantity for the future preset time period based on a gas usage quantity of a historical user; predicting a gas supply deviation rate of the gas supplier based on a gas pipeline design map, weather information for the future preset time period, and the gas demand quantity; determining a gas supply quantity for the future preset time period based on the predicted gas supply quantity and the gas supply deviation rate; determining a gas gap for the future
(Continued)

preset time period based on the gas supply quantity and the gas demand quantity; and determining the gas compensation scheme.

20 Claims, 8 Drawing Sheets

(56) References Cited

FOREIGN PATENT DOCUMENTS

| | | | | | |
|---|---|---|---|---|---|
| CN | 109253494 | A | | 1/2019 | |
| CN | 110594587 | A | | 12/2019 | |
| CN | 112488524 | A | | 3/2021 | |
| CN | 114659028 | A | * | 6/2022 | ............ F17C 13/002 |
| CN | 115147136 | A | | 10/2022 | |
| CN | 115640914 | A | | 1/2023 | |
| CN | 116336400 | A | | 6/2023 | |
| CN | 116502750 | A | | 7/2023 | |
| CN | 116632838 | A | * | 8/2023 | ............. G06Q 10/04 |
| CN | 116934375 | A | * | 10/2023 | |
| EP | 3640869 | A1 | | 4/2020 | |
| JP | H0827471 | A | | 1/1996 | |
| JP | H08163778 | A | | 6/1996 | |
| JP | H11126102 | A | | 5/1999 | |
| JP | 2002081600 | A | | 3/2002 | |
| JP | 2014203276 | A | | 10/2014 | |
| KR | 20170053907 | A | | 5/2017 | |
| KR | 20170095533 | A | | 8/2017 | |
| WO | 2008117392 | A1 | | 10/2008 | |
| WO | 2013094374 | A1 | | 6/2013 | |
| WO | 2013183309 | A1 | | 12/2013 | |
| WO | WO-2022120922 | A1 | * | 6/2022 | ............. G06Q 10/04 |

OTHER PUBLICATIONS

Wan, Xi et al., Research on Forecasting Method of Natural Gas Demand Based on GM (1,1) Model and Markov Chain, 2014 IEEE 13th International Conference on Cognitive Informatics and Cognitive Computing, 436-441, 2014.

Liu, Chunxia et al., Short-Term Natural Gas Load Forecasting Based on Wavelet Neural Network Optimized by Genetic Algorithm, Computer Systems & Applications, 29(4): 175-180, 2020.

Guo, Kuichang, Stable and Reliable Natural Gas Supply, Power and Energy, 2012, 5 pages.

* cited by examiner

500

METHOD, INTERNET OF THINGS SYSTEM, AND STORAGE MEDIUM FOR DETERMINING GAS COMPENSATION SCHEME BASED ON SMART GAS

CROSS-REFERENCE TO RELATED APPLICATIONS

This application is a continuation of U.S. application Ser. No. 18/497,987, filed on Oct. 30, 2023, which claims priority of Chinese Patent Application No. 202311214929.X, filed on Sep. 20, 2023, the contents of each of which are hereby incorporated by reference.

TECHNICAL FIELD

The present disclosure relates to the field of gas control, and in particular, to a method, an Internet of Things system, and a storage medium for determining a gas compensation scheme based on smart gas.

BACKGROUND

During peak hours of gas usage, when there is insufficient gas supply, it is necessary to call on the gas storage of the end of the pipeline and the storage reservoir to make up for the gas gap in user terminals, so as to satisfy the needs of gas users. However, different gas storage calling programs incur different costs.

CN107169633B discloses a method for comprehensive evaluation of peaking programs of gas transmission networks and gas storage reservoirs. The method adopts gas storage reservoir storage for peaking and then adopts pipeline network storage for peaking to realize seasonal gas peaking. However, the method does not address the determination of a gas compensation scheme in the event of insufficient gas supply to some user terminals occurring during peak hours of the day when gas is used, as well as the challenge of meeting user needs and safety while minimizing operating costs.

Therefore, it is desired to provide a method, an Internet of Things (IoT) system, and a storage medium for determining a gas compensation scheme based on smart gas, to determine a gas compensation scheme for the situation of insufficient gas supply to a portion of user terminals occurring during peak hours of the day when gas is used, while satisfying user demand and ensuring safety, and minimizing operating costs.

SUMMARY

One or more embodiments of the present disclosure provide a method for determining a gas compensation scheme based on smart gas, wherein the method is implemented by a smart gas management platform based on an Internet of Things system for determining a gas compensation scheme based on smart gas, comprising: determining, based on a planned gas supply quantity of a gas supplier, a predicted gas supply quantity for a future preset time period using a preset manner; predicting a gas demand quantity for the future preset time period based on a gas usage quantity of a historical user; predicting a gas supply deviation rate of the gas supplier by a deviation rate prediction model based on a gas pipeline design map, weather information for the future preset time period, and the gas demand quantity for the future preset time period, the deviation rate prediction model being a machine learning model; determining a gas supply quantity for the future preset time period based on the predicted gas supply quantity and the gas supply deviation rate; determining a gas gap for the future preset time period based on the gas supply quantity and the gas demand quantity; and determining the gas compensation scheme based on the gas gap, operational requirements of an end of a pipeline, and operational parameters of the end of the pipeline, wherein: the deviation rate prediction model includes a pipeline feature extraction layer and a deviation rate prediction layer, the pipeline feature extraction layer is configured to process the gas pipeline design map to determine a pipeline feature map, and the deviation rate prediction layer is configured to process the pipeline feature map, the weather information for the future preset time period, and the gas demand quantity for the future preset time period to determine the gas supply deviation rate of the gas supplier; the deviation rate prediction model is obtained by jointly training of the pipeline feature extraction layer and the deviation rate prediction layer based on samples and labels, the samples include historical sample gas pipeline design maps for at least one historical sample area, weather information for a historical sample time period, and a gas demand quantity for the historical sample time period, and labels include a historical sample gas deviation rate corresponding to the historical sample area of the historical sample time period; wherein the jointly training includes: inputting the historical sample gas pipeline design maps into an initial pipeline feature extraction layer and obtaining an output of the initial pipeline feature extraction layer, wherein the output of the initial pipeline feature extraction layer includes a pipeline feature map that reflects features of gas pipelines, the pipeline feature map includes nodes and edges, the nodes represent gas pipelines, node attributes of the nodes reflect relevant features of corresponding gas pipelines, the node attributes include reliability of the pipelines and a standard flow rate interval of the pipelines, the edges represent that the gas pipelines are adjacent and connected, edge attributes of the edges reflect relevant features of corresponding pathways, and the edge attributes include a degree of bending at a node connection; inputting the weather information for the historical time period, the gas demand quantity for the historical time period, and the output of the initial pipeline feature extraction layer into an initial deviation rate prediction layer and obtaining an output of the initial deviation rate prediction layer, wherein the output of the initial deviation rate prediction layer includes a gas supply deviation rate of the gas supplier, and the gas supply deviation rate of the gas supplier is a degree of deviation between a quantity of gas actually supplied by the gas supplier to an entire preset area and the predicted gas supply quantity for the future preset time period; constructing a loss function based on the output of the initial deviation rate prediction layer and the labels; updating parameters of the initial pipeline feature extraction layer and the initial deviation rate prediction layer iteratively based on the loss function until meeting a preset condition; and obtaining the deviation rate prediction model.

One or more embodiments of the present disclosure provide an Internet of Things (IoT) system for determining a gas compensation scheme based on smart gas, wherein the IoT system comprises a smart gas management platform; and the smart gas management platform is configured to: determine, based on a planned gas supply quantity of a gas supplier, a predicted gas supply quantity for a future preset time period using a preset manner; predict a gas demand quantity for the future preset time period based on a gas usage quantity of a historical user; predict a gas supply deviation rate of the gas supplier by a deviation rate prediction model based on a gas pipeline design map, weather information for the future preset time period, and the gas demand quantity for the future preset time period, the deviation rate prediction model being a machine learning model; determine a gas supply quantity for the future preset time period based on the predicted gas supply quantity and the gas supply deviation rate; determine a gas gap for the future preset time period based on the gas supply quantity and the gas demand quantity; and determine the gas compensation scheme based on the gas gap, operational requirements of an end of a pipeline, and operational parameters of the end of the pipeline, wherein: the deviation rate prediction model includes a pipeline feature extraction layer and a deviation rate prediction layer, the pipeline feature extraction layer is configured to process the gas pipeline design map to determine a pipeline feature map, and the deviation rate prediction layer is configured to process the pipeline feature map, the weather information for the future preset time period, and the gas demand quantity for the future preset time period to determine the gas supply deviation rate of the gas supplier; the deviation rate prediction model is obtained by jointly training of the pipeline feature extraction layer and the deviation rate prediction layer based on samples and labels, the samples include historical sample gas pipeline design maps for at least one historical sample area, weather information for a historical sample time period, and a gas demand quantity for the historical sample time period, and labels include a historical sample gas deviation rate corresponding to the historical sample area of the historical sample time period; wherein the jointly training includes: inputting the historical sample gas pipeline design maps into an initial pipeline feature extraction layer and obtaining an output of the initial pipeline feature extraction layer, wherein the output of the initial pipeline feature extraction layer includes a pipeline feature map that reflects features of gas pipelines, the pipeline feature map includes nodes and edges, the nodes represent gas pipelines, node attributes of the nodes reflect relevant features of corresponding gas pipelines, the node attributes include reliability of the pipelines and a standard flow rate interval of the pipelines, the edges represent that the gas pipelines are adjacent and connected, edge attributes of the edges reflect relevant features of corresponding pathways, and the edge attributes include a degree of bending at a node connection; inputting the weather information for the historical time period, the gas demand quantity for the historical time period, and the output of the initial pipeline feature extraction layer into an initial deviation rate prediction layer and obtaining an output of the initial deviation rate prediction layer, wherein the output of the initial deviation rate prediction layer includes a gas supply deviation rate of the gas supplier, and the gas supply deviation rate of the gas supplier is a degree of deviation between a quantity of gas actually supplied by the gas supplier to an entire preset area and the predicted gas supply quantity for the future preset time period; constructing a loss function based on the output of the initial deviation rate prediction layer and the labels; updating parameters of the initial pipeline feature extraction layer and the initial deviation rate prediction layer iteratively based on the loss function until meeting a preset condition; and obtaining the deviation rate prediction model.

One or more embodiments of the present disclosure provide a non-transitory computer-readable storage medium, storing computer instructions, wherein when reading the computer instructions in the storage medium, a computer executes the method for determining a gas compensation scheme based on smart gas.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTIONS

Figure 1:
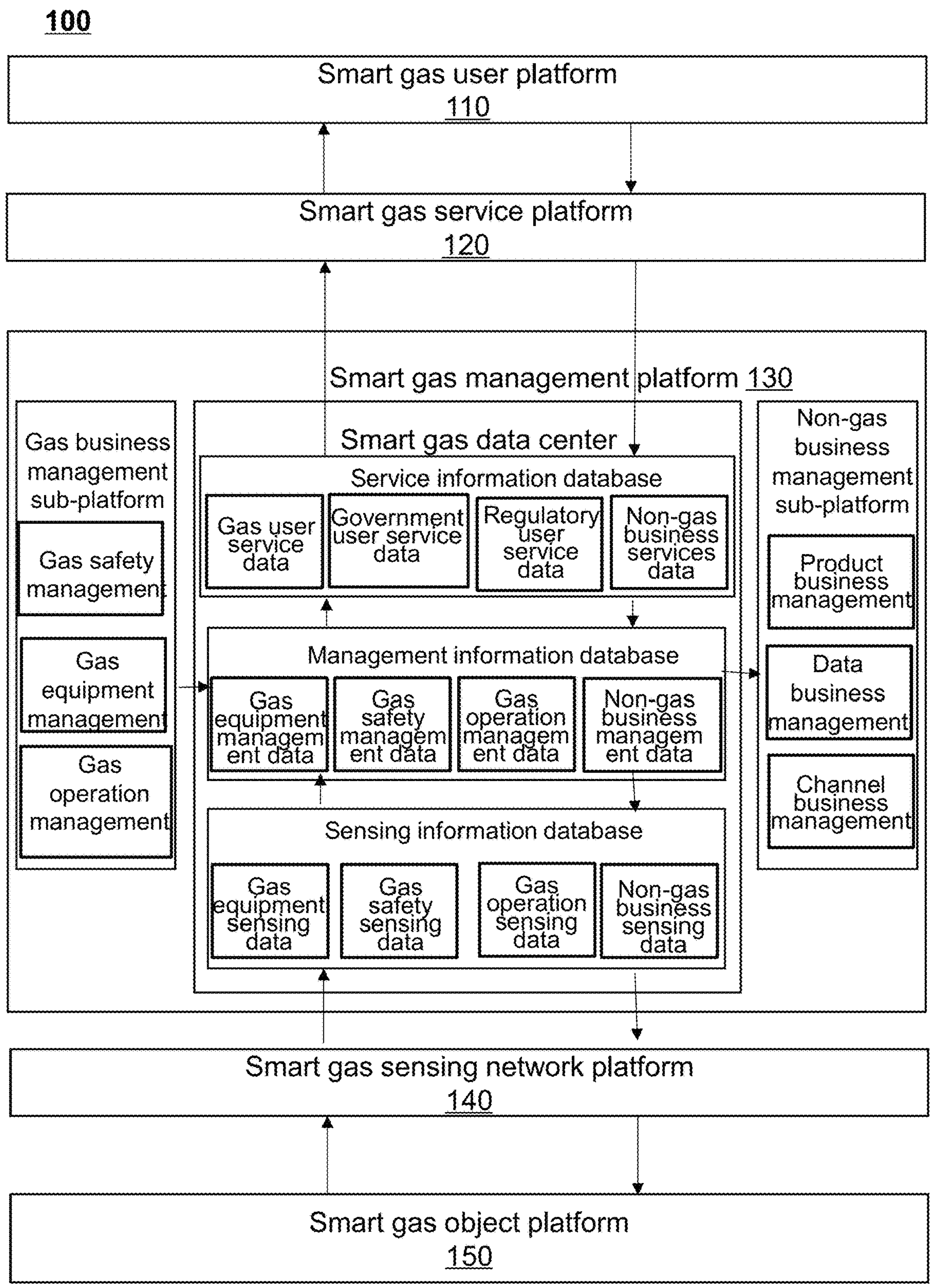
FIG. 1 is a schematic diagram of an application scenario of an IoT system for controlling a gas supply cost based on smart gas according to some embodiments in the present disclosure.

The technical solutions of the present disclosure embodiments will be more clearly described below, and the accompanying drawings need to be configured in the description of the embodiments will be briefly described below. Obviously, drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation. It should be understood that the "system", "device", "unit", and/or "module" used herein are one method to distinguish different components, elements, parts, sections, or assemblies of different levels in ascending order. However, the terms may be displaced by other expressions if they may achieve the same purpose. As shown in the present disclosure and claims, unless the context clearly prompts the exception, "a", "an", "one", and/or "the" is not specifically singular form, and the plural form may be included. It will be further understood that the terms "comprise," "comprises," "comprising," "include," "includes," and/or "including," when used in the present disclosure, specify the presence of stated steps and elements, but do not preclude the presence or addition of one or more other steps and elements thereof. The flowcharts are used in present disclosure to illustrate the operations performed by the system according to the embodiment of the present disclosure. It should be understood that the front or rear operation is not necessarily performed in order to accurately. Instead, the operations may be processed in reverse order or simultaneously. Moreover, one or more other operations may be added to the flowcharts. One or more operations may be removed from the flowcharts.

FIG. 1 is an exemplary schematic diagram of an IoT system for controlling a gas supply cost based on smart gas according to some embodiments of the present disclosure. The IoT system for controlling the cost of gas supply based on smart gas as described in the embodiments of the present disclosure will be described in detail below. It should be noted that the following embodiments are used only for explaining the present disclosure and do not constitute a limitation of the present disclosure.

In some embodiments, as shown in FIG. 1, an Internet of Things (IoT) system 100 for controlling a gas supply cost based on smart gas may include a smart gas user platform 110, a smart gas service platform 120, a smart gas management platform 130, a smart gas sensing network platform 140, and a smart gas object platform 150.

The smart gas user platform 110 may be a platform for interacting with a user. In some embodiments, the smart gas user platform 110 may be configured as a terminal device.

In some embodiments, the smart gas user platform 110 may send a query instruction for gas operation and management information (e.g., a gas compensation scheme, etc.) to the smart gas service platform 120 and receive gas operation and management information uploaded by the smart gas service platform 120. The gas operation management information may include a planned gas supply quantity of a gas supplier, a gas usage quantity of a historical user, operational requirements of an end of a pipeline, a gas gap, a gas compensation scheme, or the like.

The smart gas service platform 120 may be a platform for communicating the user's requirements and control information. The smart gas service platform 120 may obtain gas operation and management information or the like, from a smart gas data center of the smart gas management platform 130 and send it to the smart gas user platform 110.

The smart gas management platform 130 may be a platform that coordinates and harmonizes the connection and collaboration between various functional platforms, aggregates all the information of the Internet of Things (IoT), and provides perception management and control management functions for the IoT operation system.

In some embodiments, the smart gas management platform 130 may include a gas business management sub-platform, a non-gas business management sub-platform, and a smart gas data center. The gas business management sub-platform is used for gas safety management, gas equipment management, and gas operation management; and the non-gas business management sub-platform is used for product business management, data business management, and channel business management.

In some embodiments, the smart gas management platform 130 may interact with the smart gas service platform 120 and the smart gas sensing network platform 140 through the smart gas data center. For example, the smart gas data center may receive a gas operation and management information query instruction issued by the smart gas service platform 120 and upload gas operation and management information to the smart gas service platform 120. For example, the smart gas data center may send an instruction for obtaining gas equipment-related data to the smart gas sensing network platform 140 and receive the gas equipment-related data uploaded by the smart gas sensing network platform 140.

The smart gas data center includes a service information database, a management information database, and a sensing information database. The service information database interacts with the smart gas service platform 120 in both directions. The management information database interacts bi-directionally with the gas business management sub-platform, and also with the non-gas business management sub-platform. The sensing information database interacts bi-directionally with the smart gas sensing network platform 140. The service information database includes data for gas user services, government user services, regulatory user services, and non-gas business services. The management information database includes data for gas equipment management, gas safety management, gas operation management, and non-gas business management. The sensing information database includes data for gas equipment sensing, gas safety sensing, gas operation sensing, and non-gas business sensing.

The smart gas sensing network platform 140 may be a functional platform that manages sensing communications. In some embodiments, the smart gas sensing network platform 140 may be a functional platform for sensing communications of perception information and controlling information.

In some embodiments, the smart gas sensing network platform 140 may be used to interact with the smart gas data center and the smart gas object platform 150. For example, the smart gas sensing network platform 140 receives instructions from the smart gas data center to obtain gas equipment-related data and uploads the gas equipment-related data to the smart gas data center. As another example, the smart gas sensing network platform 140 receives the gas equipment-related data uploaded by the smart gas object platform 150 and sends the instruction for obtaining the gas equipment-related data to the smart gas object platform 150.

The smart gas object platform 150 may be a functional platform for generating perception information and executing control information. For example, the smart gas object platform 150 may be configured as a variety of gas and monitoring devices. The monitoring devices may include gas flow meters, temperature sensors, pressure sensors, float-type meters, or the like.

In some embodiments, the smart gas object platform 150 may receive an instruction to obtain gas equipment-related data issued by the smart gas sensing network platform 140 and upload gas equipment-related data to the smart gas sensing network platform 140.

In some embodiments of the present disclosure, the IoT system 100 may form a closed loop of information operation between the smart gas object platform and the smart gas user platform, which regularly operates under the unified management of the smart gas management platform, realizing the informatization and intellectualization of the IoT system.

Figure 2:
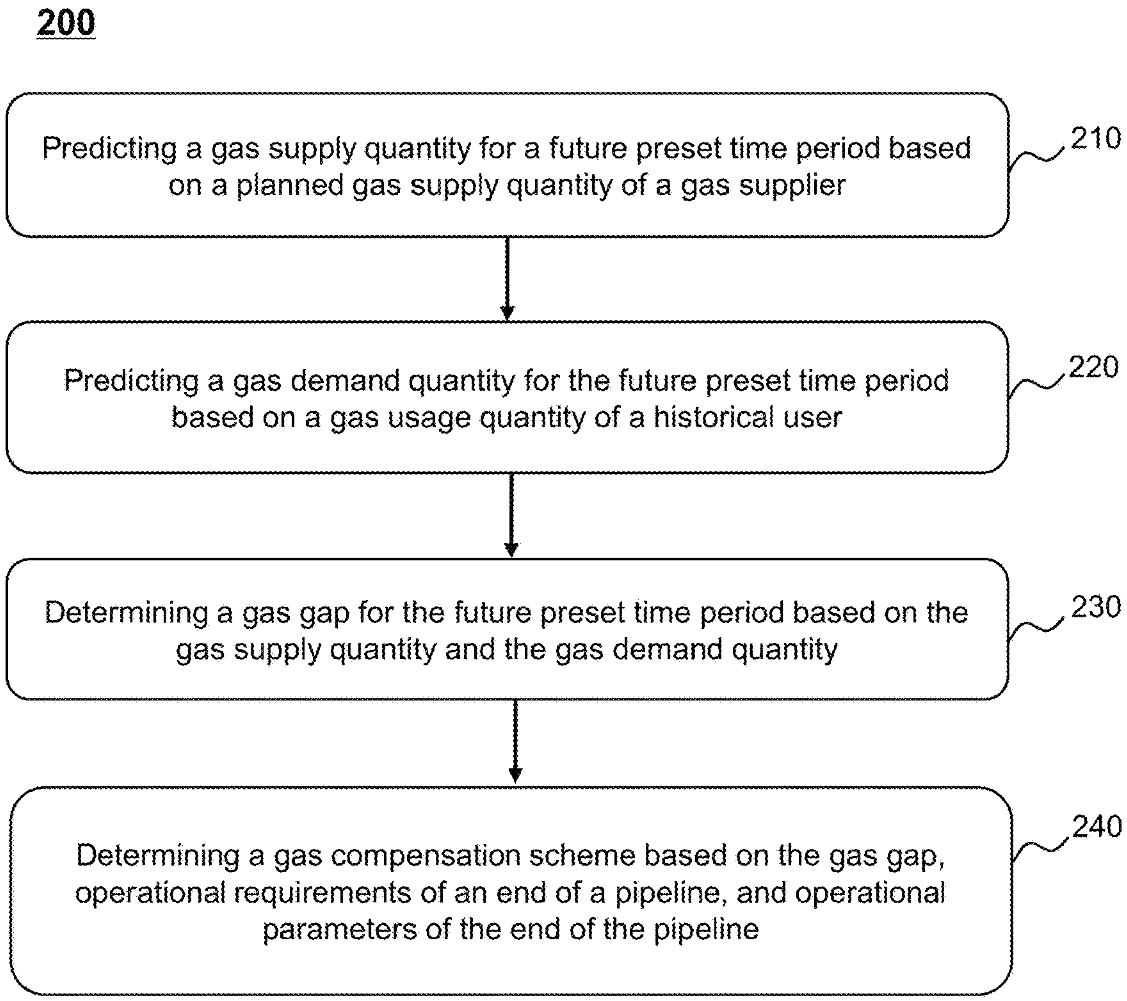
FIG. 2 is an exemplary flowchart of a method for controlling a gas supply cost based on smart gas according to some embodiments of the present disclosure.

FIG. 2 is an exemplary flowchart of a method for controlling a gas supply cost based on smart gas according to some embodiments of the present disclosure. In some embodiments, process 200 may be performed by the smart gas management platform of the IoT system 100 for controlling a gas supply cost based on smart gas. As shown in FIG. 2, the process 200 includes the following steps 210-240.

Step 210, predicting a gas supply quantity for a future preset time period based on a planned gas supply quantity of a gas supplier.

The gas supplier is a supplier that provides the gas.

The planned gas supply quantity refers to a gas supply quantity that the gas supplier has pre-planned to give to the entire preset area at various future preset time periods. The preset area may be predetermined empirically for those skilled in the art.

The smart gas management platform may obtain the gas supplier's planned gas supply quantity through the gas supplier's external information dissemination channels, such as announcements or news about the planned gas supply quantity published on the gas supplier's official website.

The future preset time period is a future point or period of time. The future preset time period may be preset for those skilled in the art according to the actual need, e.g., the future preset time period may include a peak time of the day (e.g., 10:00 a.m.-12:00 p.m. in the future, etc.) for the usage of the gas.

The gas supply quantity is a total amount of gas supply quantity that all gas suppliers may be able to provide to the entire preset area during the future preset time period.

In some embodiments, the smart gas management platform may directly take the planned gas supply quantity for the future preset time period documented in the planned gas supply quantity of the gas supplier as the gas supply quantity for the future preset time period.

Figure 3:
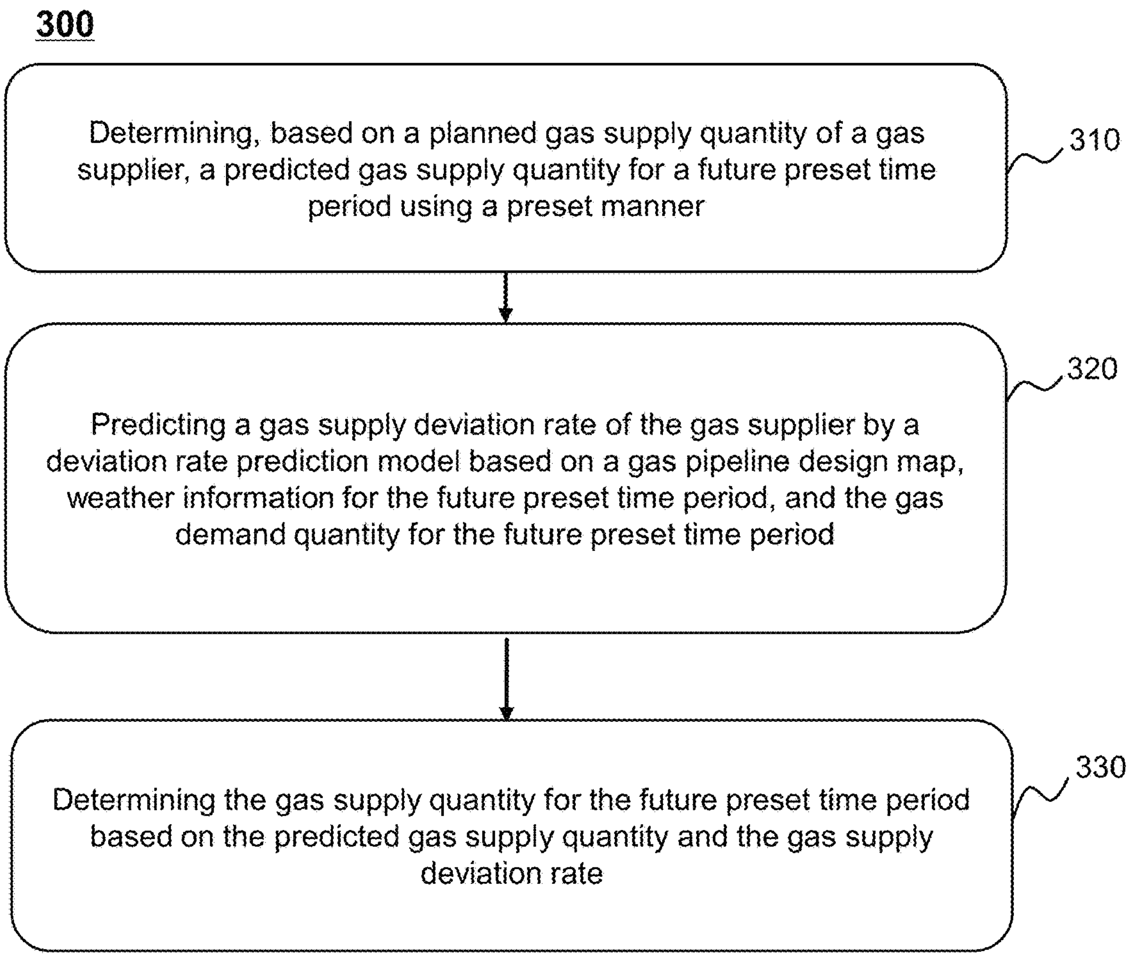
FIG. 3 is an exemplary flowchart for predicting a gas supply quantity for a future preset time period according to some embodiments of the present disclosure.

In some embodiments, the specific realization of the smart gas management platform predicting the gas supply quantity for a future preset time period based on the planned gas supply quantity from the gas supplier may also be realized using the method shown in FIG. 3. For details, please refer to the description of FIG. 3.

Step 220, predicting a gas demand quantity for the future preset time period based on a gas usage quantity of a historical user.

The gas usage quantity of the historical user is an amount of gas that has been used by all historical users throughout a preset area.

In some embodiments, the smart gas management platform may obtain the gas usage quantity of historical users throughout the preset area via a metering device (e.g., a gas meter, etc.).

The gas demand quantity refers to a total amount of gas demand quantity of all users in the preset area during the future preset time period.

In some embodiments, the smart gas management platform may directly use the gas usage quantity of historical users during the target historical time period as the gas demand quantity for the future preset time period. Herein, the target historical time period corresponds to a historical time period of the future preset time period. For example, when it is necessary to predict the gas usage quantity from 10:00 to 12:00 p.m. in the future, the smart gas management platform may use a gas usage quantity of historical users from 10:00 to 12:00 p.m. on a certain day in the past as the gas demand quantity for the future 10:00-12:00 p.m.

Figure 4:
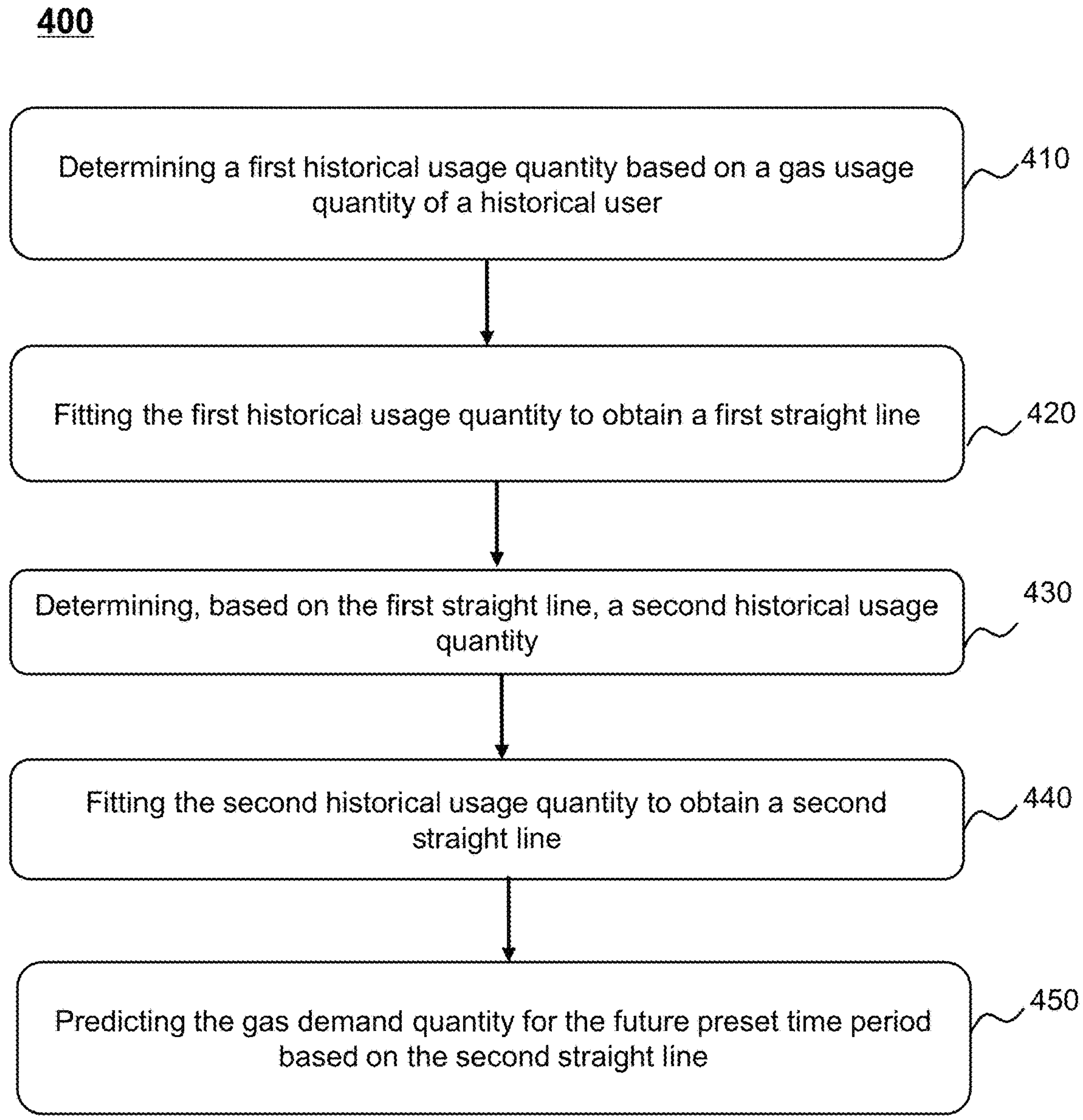
FIG. 4 is an exemplary flowchart for predicting a gas demand quantity for a future preset time period according to some embodiments of the present disclosure.

In some embodiments, the smart gas management platform may implement a specific process shown in FIG. 4 to predict the gas demand quantity for future preset time period based on the gas usage quantity of the historical users, as described in FIG. 4.

Step 230, determining a gas gap for the future preset time period based on the gas supply quantity and the gas demand quantity.

The gas gap refers to the shortfall between the gas demand quantity and the gas supply quantity of all users in the entire preset area during the future preset time period.

In some embodiments, the smart gas management platform may determine the gas gap for the future preset time period using the following first algorithm:

gas gap for the future preset time period=gas demand quantity for the future preset time period−gas supply quantity for the future preset time period.

Step 240, determining a gas compensation scheme based on the gas gap, operational requirements of an end of a pipeline, and operational parameters of the end of the pipeline.

The end of the pipeline refers to a portion of a pipeline segment from the last pressure station to the end of the pipeline. A pressure station is a site that pressurizes natural gas. The end of the pipeline may store a portion of the gas for future usage.

The operational requirements refer to requirements to ensure the proper operation of the end of the pipeline, such as maintaining the pressure of the end of the pipeline above a preset pressure threshold. The preset pressure threshold may be set by those skilled in the art based on experience.

The operational parameters refer to the parameters related to the operation of the end of the pipeline. In some embodiments, the operational parameters may include one or more of the flow parameters (such as a flow rate, pressure, and temperature), storage capacity, etc., of the end of the pipeline.

In some embodiments, the smart gas management platform may obtain the operational parameters of the end of the pipeline through a gas flow meter. The gas flow meter is an instrument used to measure the flow of gas. Gas flow meters may include gas ultrasonic flow meters, gas turbine flow meters, Roots flow meters, or the like.

The gas flow meters may measure parameters such as gas flow rate, pressure, temperature, and storage capacity, and are usually installed upstream and downstream of the gas pipeline to detect real-time changes in the flow of gas.

The gas compensation scheme refers to a gas storage and utilization quantity plan determined in response to the gas gap.

In some embodiments, the gas compensation scheme may include a gas storage and transfer quantity of the end of the pipeline and/or a gas storage and transfer quantity of at least one gas storage station.

The gas storage and transfer quantity of the end of the pipeline refers to a gas storage quantity of the end of the pipeline that may be transferred in the future preset time period.

The gas storage station is a site where natural gas is converted into liquefied natural gas (LNG) or compressed natural gas (CNG) and stored.

The gas storage and transfer quantity of the gas storage station refers to a gas storage quantity of the gas storage station that may be transferred in the future preset time period.

In some embodiments, the smart gas management platform may determine the gas compensation scheme based on the gas gap, the operational requirements of the end of the pipeline, and the operational parameters of the end of the pipeline via a first preset comparison table. In some embodiments, the first preset comparison table includes a reference gas gap, a reference operational requirement of the end of the pipeline, and a correspondence between reference operational parameters of the end of the pipeline and a reference gas compensation scheme. In some embodiments, the first preset comparison table may be constructed based on prior knowledge or historical data.

In some embodiments, the smart gas management platform may also determine the effective gas storage quantity of the end of the pipeline for the future preset time period based on the operational requirements of the end of the pipeline and the operational parameters of the end of the pipeline; and determine the gas compensation scheme based on the effective gas storage quantity of the end of the pipeline and the gas gap.

The effective gas storage quantity of the end of the pipeline refers to an amount of gas storage that may be accessed by the end of the pipeline in the future preset time period.

In some embodiments, the smart gas management platform may determine the effective gas storage quantity of the end of the pipeline for a future preset time period based on the operational requirements and the operational parameters of the end of the pipeline, by referring to a second preset comparison table. In some embodiments, the second preset comparison table includes the reference operational requirements of the end of the pipeline, and the correspondence between the reference operational parameters of the end of the pipeline and the effective gas storage quantity of the end of the pipeline during the reference target historical time period. The reference target historical time period corresponds to the future preset time period. In some embodiments, the second preset comparison table may be constructed based on prior knowledge or historical data.

In some embodiments, the operational parameters of the end of the pipeline include gas storage quantity, and the future preset time period includes multiple future sub-time periods. The specific implementation manner of the smart gas management platform for determining the effective gas storage quantity of the end of the pipeline for the future preset time period based on the operational requirements and the operational parameters of the end of the pipeline may also be implemented using the method shown in FIG. 5, please refer to FIG. 5 for details.

In some embodiments, the smart gas management platform may determine the gas compensation scheme based on the effective gas storage quantity of the end of the pipeline and the gas gap by referring to a third preset comparison table. In some embodiments, the third preset comparison table includes the reference effective gas storage quantity of the end of the pipeline and the correspondence between the reference gas gap and the reference gas compensation scheme. In some embodiments, the third preset comparison table may be constructed based on prior knowledge or historical data.

Figure 8:
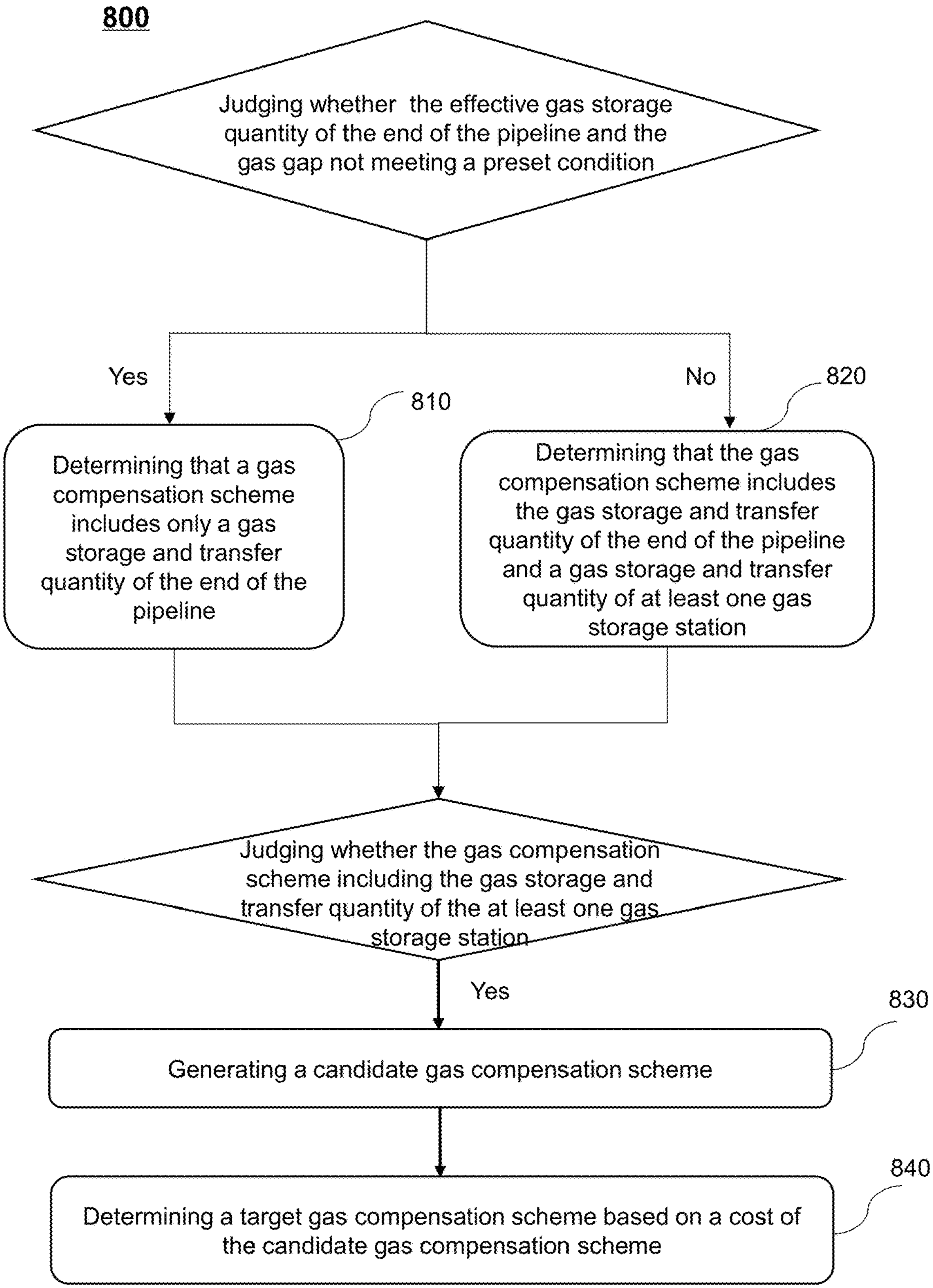
FIG. 8 is an exemplary flowchart for determining a gas compensation scheme according to some embodiments of the present disclosure.

In some embodiments, the specific implementation manner of the smart gas management platform to determine the gas compensation scheme based on the effective gas storage quantity of the end of the pipeline and the gas gap may also be implemented using the method shown in FIG. 8, please refer to FIG. 8 for details.

In some embodiments of the present disclosure, the gas gap for a future preset time period is determined by predicting the gas supply quantity and the gas demand quantity for the future preset time period. The gas compensation scheme is then determined based on the gas gap, the operational requirements of the end of the pipeline, and the operational parameters of the end of the pipeline, which may cope with gas supply shortfalls of some user terminals occurring during peak hours of gas usage in a day and minimize operating costs while meeting user demand and ensuring safety.

FIG. 3 is an exemplary flowchart for predicting a gas supply quantity for a future preset time period according to some embodiments of the present disclosure. In some embodiments, the process 300 may be performed by the smart gas management platform based on the IoT system 100 for controlling a gas supply cost based on smart gas. As shown in FIG. 3, the process 300 comprises steps 310-330.

Step 310, determining, based on a planned gas supply quantity of a gas supplier, a predicted gas supply quantity for a future preset time period using a preset manner.

For an explanation of the planned gas supply quantity, see the description of step 210 in FIG. 2.

The predicted gas supply quantity is a pre-estimate gas supply quantity for an entire preset area during the future preset time period.

In some embodiments, the preset manner may be using a value, obtained by the smart gas management platform through summing up the planned gas supply quantity of all gas suppliers in the entire preset area during the future preset time period, as the predicted gas supply quantity for the future preset time period.

Step 320, predicting a gas supply deviation rate of the gas supplier by a deviation rate prediction model based on a gas pipeline design map, weather information for the future preset time period, and the gas demand quantity for the future preset time period.

The gas pipeline design map refers to a design map of gas pipelines for the entire preset area.

In some embodiments, the smart gas management platform may obtain the gas pipeline design map from a known database. The known database stores a plurality of gas pipeline design maps for multiple preset areas.

The weather information for the future preset time period may include one or more of a temperature, air pressure, air humidity, etc., in the preset area during the future preset time period.

In some embodiments, the smart gas management platform may obtain the weather information for the future preset time period through a third party (e.g., a weather bureau).

For an explanation of the gas demand quantity, see the instructions for step 220 in FIG. 2.

The gas supply deviation rate is a degree of deviation between an amount of gas actually supplied by the gas supplier to the entire preset area and the predicted gas supply quantity in the future preset time period.

In some embodiments, the deviation rate prediction model may be a machine learning model. In some embodiments, the type of the deviation rate prediction model may include a Neural Network (NN) model and a Convolutional Neural Network (CNN) model.

In some embodiments, the deviation rate prediction model may include a pipeline feature extraction layer and a deviation rate prediction layer. The pipeline feature extraction layer may be a CNN model or the like. The deviation rate prediction layer may be an NN model or the like.

In some embodiments, the pipeline feature extraction layer may be used to process the gas pipeline design map to determine a pipeline feature map.

The pipeline feature map is a map that reflects the features of the gas pipelines. In some embodiments, the pipeline feature map is a data structure including nodes and edges, with edges connecting nodes, and the nodes and edges may have attributes.

In some embodiments, the nodes of the pipeline feature map may represent gas pipelines. The node attributes may reflect relevant features of the corresponding gas pipelines. For example, the node attributes include the reliability of the pipeline and the standard flow rate interval of the pipeline.

Figure 7:
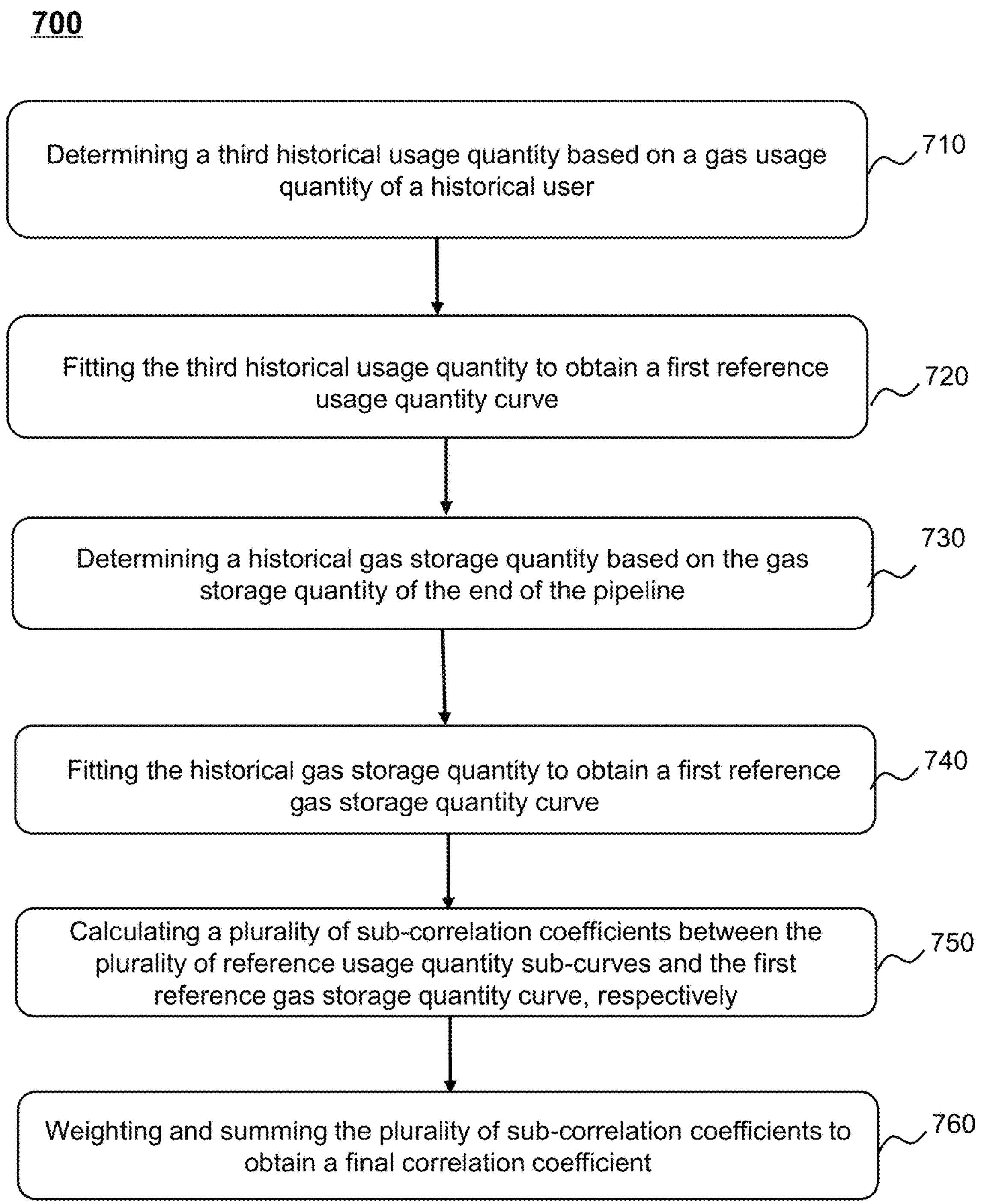
FIG. 7 is another exemplary flowchart for determining a correlation coefficient according to some embodiments of the present disclosure.

For an explanation of the reliability of the pipeline, please refer to the related description in FIG. 7.

The standard flow rate interval of the pipeline refers to a range of standard flow rates within the gas pipeline.

In some embodiments, the edges of the pipeline feature map may correspond to pathways that exist between gas pipelines within the preset area. The edges represent that the gas pipelines are adjacent and connected. The edge attributes may reflect relevant features of the corresponding pathways. For example, the edge attributes include a degree of bending at a node connection.

The degree of bending at a node connection refers to a degree of bending at the connection of two neighboring pipelines. The degree of bending at a node connection may affect the distribution within the pipeline, and the distribution may affect the accuracy of the metering device (such as a gas meter), which in turn affects the prediction of the gas supplier's gas supply deviation rate.

In some embodiments, the deviation rate prediction layer may be used to process the pipeline feature map, the weather information for the future preset time period, and the gas demand quantity for the future preset time period to determine the gas supply deviation rate of the gas supplier.

In some embodiments of the present disclosure, in the process of predicting the gas supply deviation rate from the gas supplier, the influence of the pipeline delivery capacity in the gas pipeline design map, the weather information of the future preset time period, and the gas demand quantity in the future preset time period are considered, thereby improving the accuracy of the final predicted gas supply deviation rate from the gas supplier.

In some embodiments, the deviation rate prediction model may be obtained based on a large number of labeled training samples, jointly trained by a pipeline feature extraction layer and a deviation rate prediction layer.

The training samples may include the historical sample gas pipeline design maps for at least one historical sample area, the weather information for the historical sample time period, and the gas demand quantity for the historical sample time period, and the training label may be the historical sample gas deviation rate corresponding to the historical sample area of the historical sample time period. The historical sample gas deviation rate may be obtained using a second algorithm as follows:

The historical sample gas deviation rate=(the actual gas supply quantity for the historical sample period−the sum of the planned gas supply quantity of all gas suppliers for the historical sample period)÷the sum of the planned gas supply quantity of all gas suppliers for the historical sample period×100%.

The actual gas supply quantity for the historical sample period and the sum of the planned gas supply quantity from all gas suppliers for the historical sample period may be obtained based on historical data. The labels of the training samples may be obtained manually.

In some embodiments, a historical sample gas pipeline design map from the labeled training samples may be input into an initial pipeline feature extraction layer. The weather information for the historical time period of the historical samples, the gas demand quantity for the same historical time period of the historical samples, and the historical sample pipeline feature map output from the initial pipeline feature extraction layer are then input into an initial deviation rate prediction layer, and the loss function is constructed based on the labels and the prediction results of the initial deviation rate prediction layer. Based on the loss function, the parameters of the initial pipeline feature extraction layer and the probability distribution prediction layer of the initial deviation rate prediction layer are iteratively updated until the loss function converges or the number of iterations reaches the threshold, etc., and the training is completed, obtaining the trained deviation rate prediction model.

In some embodiments, the smart gas management platform may input the gas pipeline design map, the weather information for the future preset time period, and the gas demand quantity for the future preset time period into the trained deviation rate prediction model, and the deviation rate prediction model outputs the gas supply deviation rate of the gas supplier.

Step 330, determining the gas supply quantity for the future preset time period based on the predicted gas supply quantity and the gas supply deviation rate.

In some embodiments, the smart gas management platform may determine the gas supply quantity for a future preset time period using a third algorithm as follows:

the gas supply quantity for a future preset time period=a predicted gas supply quantity for a future preset time period×(1+gas supply deviation rate of the gas supplier).

In some embodiments of the present disclosure, in the process of predicting the gas supply quantity for a future preset time period, a variety of factors such as a gas pipeline design map, weather information for a future preset time period, the amount of gas demand quantity, and the predicted gas supply quantity, etc., are taken into account in the process of predicting the gas supply quantity for the future preset time period. In the process of predicting the gas supply in the future, it takes into account the influence of various factors such as weather information, gas demand quantity, and predicted gas supply quantity in the future preset time period, and improves the accuracy of the final predicted gas supply quantity in the future preset time period.

FIG. 4 is an exemplary flowchart for predicting a gas demand quantity for a future preset time period according to some embodiments of the present disclosure. In some embodiments, the process 400 may be performed by a smart gas management platform based on the IoT system 100 for controlling a gas supply cost based on smart gas. As shown in FIG. 4, the process 400 includes the following steps 410-450.

Step 410, determining a first historical usage quantity based on a gas usage quantity of a historical user.

For an explanation of the gas usage quantity of the historical users, please refer to the description of step 220 in FIG. 2.

In some embodiments, the first historical usage quantity is the gas usage quantity of the historical users during a target historical time period. The target historical time period may be a historical time period corresponding to a future preset time period.

In some embodiments, the smart gas management platform may directly filter the gas usage quantity of a plurality of historical users at a target historical time period from the gas usage of the historical users, as the first historical usage quantity. For example, if the gas demand quantity is predicted for the time period of 10:00 a.m. to 12:00 p.m. in the future, the smart gas management platform may directly filter the gas usage quantity of the historical users from 10:00 a.m. to 12:00 p.m. every day during a historical time period (e.g., the past 1 or 2 months) as the first historical usage quantity.

Step 420, fitting the first historical usage quantity to obtain a first straight line.

The first straight line is a line that passes through as many coordinate points corresponding to the first historical usage quantity as possible. The horizontal coordinate of the first straight line represents a date, and the vertical coordinate represents the gas usage of the historical user corresponding to that date.

In some embodiments, the smart gas management platform may fit the first historical usage quantity using fitting algorithms such as least squares and gradient descent to obtain a first straight line.

Step 430, determining, based on the first straight line, a second historical usage quantity.

The second historical usage quantity may be a gas usage quantity from the first historical usage quantity that satisfies a preset distance condition with respect to the first straight line. The distance between the first historical usage quantity and the first straight line may be a perpendicular distance between the point where the first historical usage quantity is located and the first straight line.

The preset distance condition refers to a pre-set distance threshold, such as a distance less than the preset distance threshold. The preset distance threshold may be determined by those skilled in the art based on experience in the field.

In some embodiments, the preset distance condition may be related to the data percentage of gas usage that satisfies the preset distance condition.

The data percentage refers to a ratio of a count of days in the historical preset time period where the gas usage satisfies the preset distance condition (e.g., less than the preset distance threshold) to a total count of days in the historical preset time period.

In some embodiments, the preset distance condition is set to achieve a desired data percentage (e.g., the data percentage achieved to 90%).

In some embodiments of the present disclosure, the accuracy of the predicted gas demand quantity for a future preset time period is improved by removing the usage data of some historical users with significant fluctuations.

In some embodiments, the smart gas management platform may directly use the gas usage quantity from the first historical usage quantity that satisfies the preset distance condition (e.g., less than the preset distance threshold) as the second historical usage quantity.

Step 440, fitting the second historical usage quantity to obtain a second straight line.

The second straight line refers to a line formed by passing through as many coordinate points corresponding to the second historical usage quantity as possible. The meaning and fitting manner of the horizontal and vertical coordinates of the second straight line are the same as those of the first straight line, as described in the description of the first straight line.

Step 450, predicting the gas demand quantity for the future preset time period based on the second straight line.

In some embodiments, the smart gas management platform may directly use the gas usage quantity of the historical users on the second straight line during the target historical time period as the gas demand quantity for the future preset time period. Wherein, the target historical time period corresponds to the future preset time period.

In some embodiments of the present disclosure, the gas usage data of the historical users with large fluctuations are eliminated, and then the gas demand quantity for a future preset time period is determined based on the remaining gas usage data of the historical users, thereby improving the accuracy of the final prediction of the gas demand quantity for the future preset time period.

Figure 5:
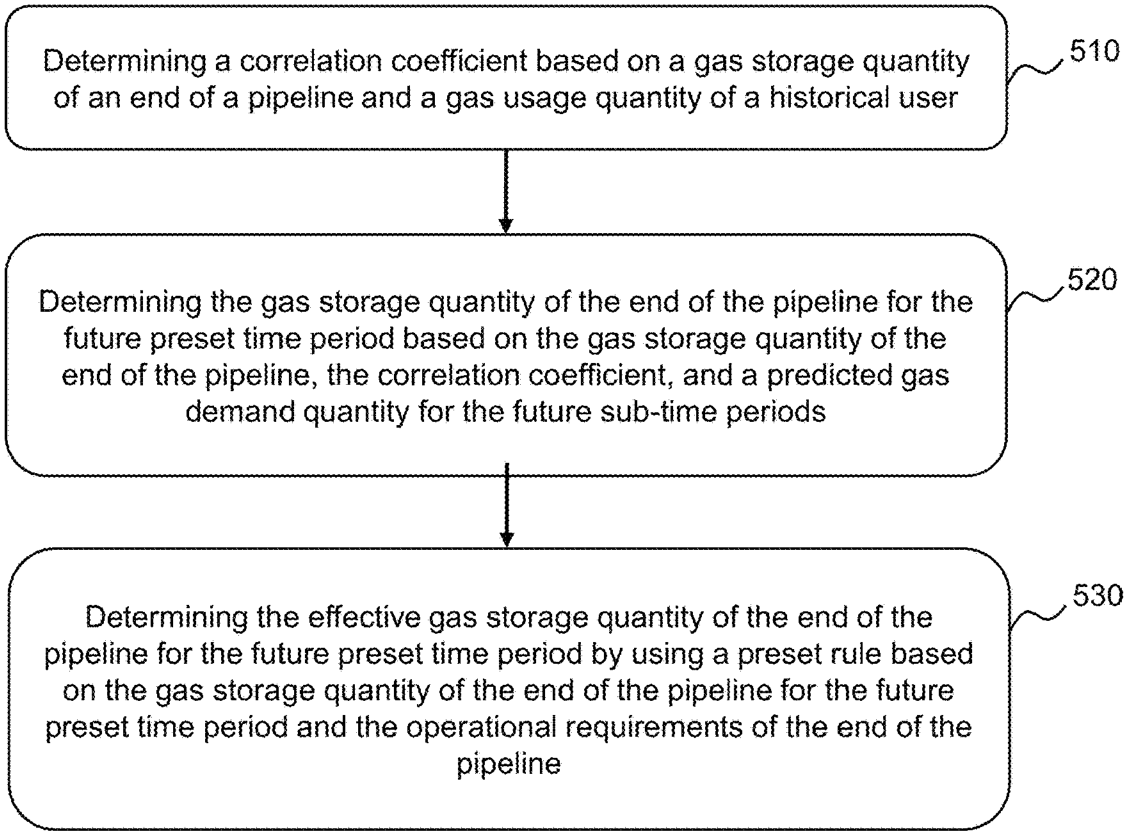
FIG. 5 is an exemplary flowchart for determining an effective gas storage quantity of an end of a pipeline for a future preset time period according to some embodiments of the present disclosure.

FIG. 5 is an exemplary flowchart for determining an effective gas storage quantity of an end of a pipeline for a future preset time period according to some embodiments of the present disclosure. In some embodiments, the process 500 may be executed by the smart gas management platform based on the IoT system 100. As shown in FIG. 5, the process 500 comprises steps 510 to 530 as follows.

Step 510, determining a correlation coefficient based on a gas storage quantity of an end of a pipeline and a gas usage quantity of a historical user.

In some embodiments, operational parameters of the end of the pipeline include the gas storage quantity of the end of the pipeline. The gas storage quantity of the end of the pipeline refers to an amount of gas stored of the end of the pipeline. The gas storage quantity of the end of the pipeline may include the gas storage quantities of the end of the pipeline for both historical and current time periods. In some embodiments, only the remaining gas storage quantity of the end of the pipeline after being used by the gas consumer terminal may be considered as the effective storage quantity of the end of the pipeline. The remaining gas storage quantity may be used as the effective gas storage quantity of the end of the pipeline.

For an explanation of the gas usage of the historical users, refer to the description of step 220 in FIG. 2.

In some embodiments, the correlation coefficient characterizes correlation between the change in gas usage of the historical users and the change in gas storage of the end of the pipeline. For example, the correlation coefficient characterizes a negative correlation between the change in gas usage of the historical users and the change in gas storage of the end of the pipeline.

In some embodiments, the smart gas management platform may calculate the gas usage of all historical users for each day in the target historical time period (e.g., 10:00~10:30), plot a usage curve, and fit the curve to obtain a reference usage quantity curve. The target historical time period corresponds to the future preset time period.

In some embodiments, the smart gas management platform may statistically count the actual gas storage quantity of the end of the pipeline for each day in the target historical time period (e.g., 10:00~10:30), plot it as an actual storage quantity curve, and fit the curve to obtain a reference storage quantity curve;

In some embodiments, the smart gas management platform may calculate the correlation coefficient between the reference usage quantity curve and the reference storage quantity curve using a correlation coefficient analysis algorithm (e.g., Pearson correlation coefficient algorithm, Chebyshev correlation coefficient algorithm, etc.).

The gas usage of all historical users may be obtained through a metering device. The actual amount of gas stored of the end of the pipeline may be obtained by prior art, for example, by collecting using a float-type meter.

In some embodiments, the correlation coefficient may be negative if there is a negative correlation between the reference usage quantity curve and the reference gas storage quantity curve.

Figure 6:
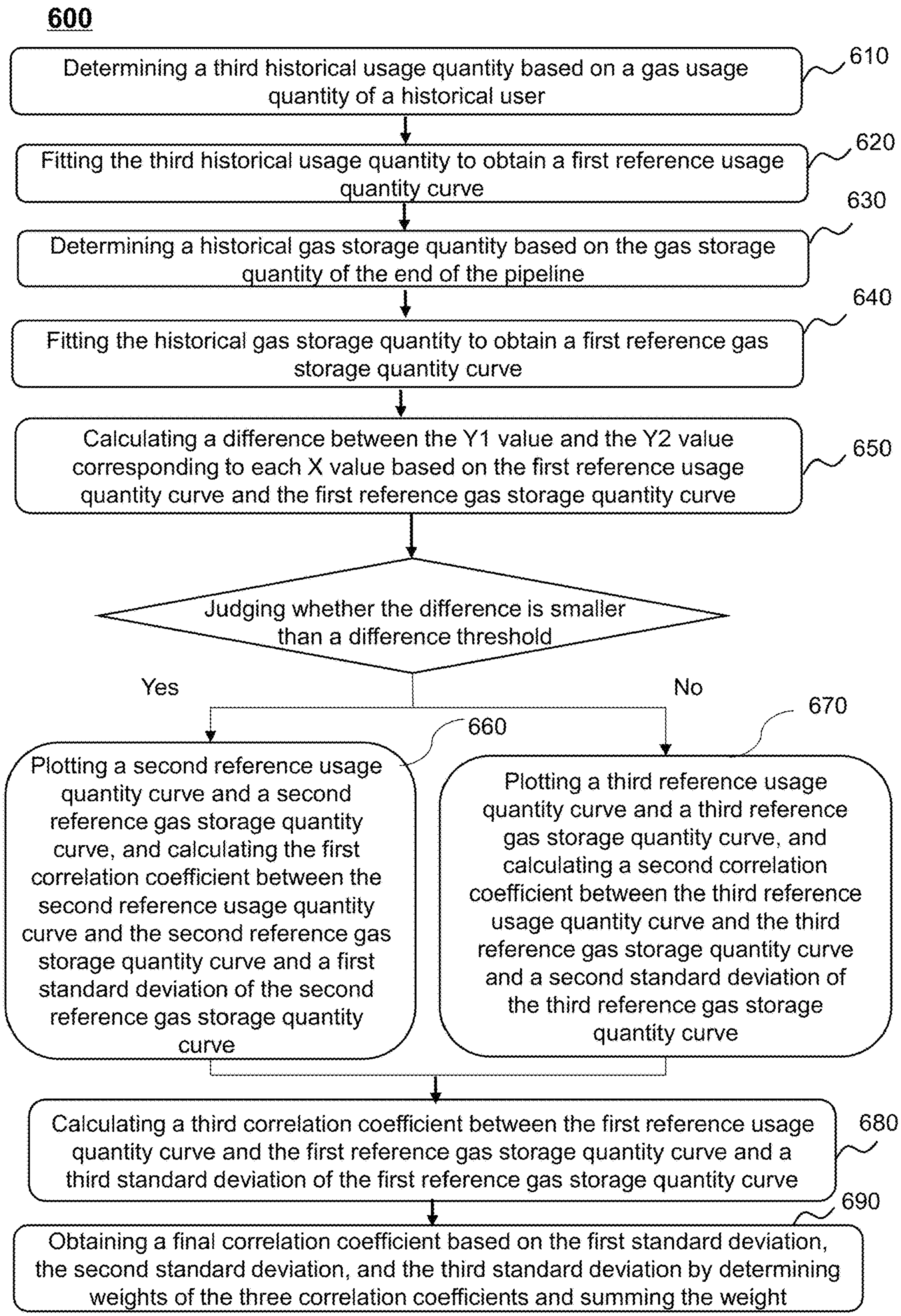
FIG. 6 is an exemplary flowchart for determining a correlation coefficient according to some embodiments of the present disclosure.

In some embodiments, a specific implementation manner for the smart gas management platform to determine a correlation coefficient based on the gas storage quantity at the end of a pipeline and the gas usage quantity of a historical user may also be implemented using a process shown in FIG. 6 or FIG. 7, as described in FIGS. 6-7.

Step 520, determining the gas storage quantity of the end of the pipeline for the future preset time period based on the gas storage quantity of the end of the pipeline, the correlation coefficient, and a predicted gas demand quantity for the future sub-time periods.

In some embodiments, the future preset time period includes a plurality of future sub-time periods. The future sub-time periods are portions of the future preset time periods. For example, if the future preset time period is 12 o'clock in the future and the current point in time is 10 o'clock, the future sub-time periods may include 10:00~10:30, 10:30~11:00, 11:00~11:30, and 11:30~12:00.

The gas demand quantity of the future sub-time period is the gas demand quantity of all users in the entire preset area for the future sub-time period.

The manner with respect to the predicted gas demand quantity for the future sub-time periods is similar to the manner with respect to the predicted gas demand quantity for the future preset time periods, as described in connection with step 220 of FIG. 2.

In some embodiments, the smart gas management platform may calculate the gas storage quantity of the end of the pipeline for each future sub-time period in chronological order, and then use the gas storage quantity of the end of the pipeline for the last future sub-time period obtained by the calculation as the gas storage quantity of the end of the pipeline for the future preset time period.

The gas storage quantity of the end of the pipeline for the future sub-time period is calculated as follows: Gas storage quantity=Current gas storage quantity of the end of the pipeline×(1+rate of change of gas demand quantity for the future sub-time period×correlation coefficient for the future sub-time period). The rate of change of the gas demand quantity for the future sub-time period is defined as the ratio of the gas demand quantity corresponding to the future sub-time period to the length of time corresponding to the future sub-time period.

For example, if the current time is 10:00 AM and the gas storage quantity may be predicted of the end of the pipeline at 12:00 PM, and the future preset time periods include sub-time periods of 10:00 to 10:30, 10:30 to 11:00, 11:00 to 11:30, and 11:30 to 12:00; the gas demand quantity corresponding to a plurality of future sub-time periods are a1, a2, a3, and a4 respectively;

Based on the historical sub-time periods of 10:00~10:30, 10:30~11:00, 11:00~11:30, and 11:30~12:00, and the corresponding gas storage of the end of the pipeline and gas usage of the historical users, the correlation coefficients between gas usage and gas storage of the end of the pipeline are m1, m2, m3, and m4 respectively; and the correlation coefficients m1, m2, m3, and m4 are negative.

Therefore, the predicted gas storage of the end of the pipeline at 10:30 is: current gas storage of the end of the pipeline×(1+the correlation coefficient m1×the rate of change of the gas demand quantity from 10:00 to 10:30), and the rate of change of the gas demand quantity from 10:00 to 10:30 is a1/0.5, where 0.5 represents the hour of interval between 10:00 and 10:30.

Similarly, the predicted gas storage of the end of the pipeline at 11:00 in the future is: the predicted gas storage of the end of the pipeline at 10:30 in the future×(1+the correlation coefficient m2×rate of change of the gas demand quantity from 10:30 to 11:00), wherein the rate of change of the gas demand quantity from 10:30 to 11:00=a2/0.5;

The predicted future gas storage quantity of the end of the pipeline at 11:30 is: the predicted future gas storage quantity of the end of the pipeline at 11:00×(1+the correlation coefficient m3×rate of change of the gas demand quantity from 11:00 to 11:30), wherein the rate of change of the gas demand quantity from 11:00 to 11:30=a3/0.5;

The predicted future gas storage of the end of the pipeline at 12:00 is: the predicted future gas storage of the end of the pipeline at 11:30×(1+the correlation coefficient m4×rate of change of the gas demand quantity from 11:30 to 12:00), wherein the rate of change of the gas demand quantity from 11:30 to 12:00=a4/0.5.

Step 530, determining the effective gas storage quantity of the end of the pipeline for the future preset time period by using a preset rule based on the gas storage quantity of the end of the pipeline for the future preset time period and the operational requirements of the end of the pipeline.

In some embodiments, the preset rule may establish a correspondence between the operational requirements of the end of the pipeline for the future preset time period, the storage capacity of the end of the pipeline, the pressure and temperature of the pipeline, and the effective gas storage quantity of the end of the pipeline for the future preset time period. In some embodiments, the smart gas management platform may determine the pipeline pressure and temperature for the future preset time period by analyzing the correlation between the changes in gas usage by the historical users and the changes in the gas storage quantity of the end of the pipeline.

In some embodiments, the smart gas management platform may query the correspondence in the preset rules based on the gas storage quantity of the end of the pipeline in the future preset time period, the operational requirements of the end of the pipeline, the pipeline pressure, and the pipeline temperature, to determine the effective gas storage quantity of the end of the pipeline for the future preset time period.

In some embodiments of the present disclosure, the process of determining the effective gas storage quantity of the end of the pipeline or a future preset time period considers the gas storage quantity of the end of the pipeline for the future preset time period as well as the impact of the operational requirements of the end of the pipeline. Furthermore, the process of determining the gas storage quantity of the end of the pipeline for the future preset time period also takes into account various factors, such as the gas storage quantity of the end of the pipeline, the correlation coefficient, and the predicted the gas demand quantity for future sub-time periods, thereby improving the accuracy of predicting the effective gas storage quantity of the end of the pipeline for the future preset time period.

FIG. 6 is an exemplary flowchart for determining a correlation coefficient according to some embodiments of the present disclosure. In some embodiments, the process 600 may be executed by a smart gas management platform based on the IoT system 100. As shown in FIG. 6, the process 600 includes Steps 610 to 690.

Step 610, determining a third historical usage quantity based on a gas usage quantity of a historical user.

The third historical usage quantity may be a gas usage of a historical user during a target historical time period. The target historical time period may correspond to a future preset time period.

In some embodiments, the smart gas management platform may filter out the gas usage quantity of multiple historical users during the target historical time period from the gas usage quantity of the historical users, and directly use it as the third historical usage quantity.

Step 620, fitting the third historical usage quantity to obtain a first reference usage quantity curve.

The first reference usage quantity curve is a curve that passes through all the coordinate points corresponding to the third historical usage quantity. The horizontal coordinate X of the first reference usage quantity curve represents the date, and the vertical coordinate Y represents the gas usage of the historical user corresponding to that date.

In some embodiments, the first reference usage quantity curve includes a plurality of X values and their corresponding Y1 values.

In some embodiments, the smart gas management platform may fit the first reference usage quantity curve by connecting the coordinate points corresponding to all of the third historical usage quantity.

Step 630, determining a historical gas storage quantity based on the gas storage quantity of the end of the pipeline.

For an explanation of the gas storage quantity of the end of the pipeline, see the description of step 510 in FIG. 5.

The historical storage quantity is an amount of gas stored of the end of the pipeline for the historical users during the target historical time period. The target historical time period is the historical time period corresponding to the future preset time period.

In some embodiments, the smart gas management platform may filter the storage quantities of the end of the pipeline and select the storage quantities of the end of the pipeline for multiple historical users during the target historical time period, which are directly used as the historical storage quantities.

Step 640, fitting the historical gas storage quantity to obtain a first reference gas storage quantity curve.

The first reference gas storage quantity curve is a curve formed by connecting all coordinate points corresponding to the historical gas storage. The horizontal axis X of the first reference gas storage quantity curve represents the date, and the vertical axis Y represents the gas storage of the end of the pipeline corresponding to that date.

In some embodiments, the first reference gas storage quantity curve may include multiple X values and their corresponding Y2 values.

In some embodiments, the smart gas management platform may fit the first reference gas storage quantity curve by connecting all coordinate points corresponding to the historical gas storage.

Step 650, calculating a difference between the Y1 value and the Y2 value corresponding to each X value based on the first reference usage quantity curve and the first reference gas storage quantity curve.

Step 660, in response to a difference between the Y1 value and the Y2 value corresponding to the X value being less than a difference threshold, extracting a coordinate point (X, Y1) from the first reference usage quantity curve and a coordinate point (X, Y2) from the first reference gas storage quantity curve, plotting a second reference usage quantity curve based on all extracted coordinate points (X, Y1), plotting a second reference gas storage quantity curve based on all extracted coordinate points (X, Y2), and calculating the first correlation coefficient between the second reference usage quantity curve and the second reference gas storage quantity curve and a first standard deviation of the second reference gas storage quantity curve.

The difference threshold is a preset value for those skilled in the art.

The second reference usage quantity curve is a curve plotted based on all the coordinate points (X, Y1) extracted from the first reference usage quantity curve, where the difference between the Y1 value and the Y2 value corresponding to the X value in all the coordinate points (X, Y1) is smaller than the difference threshold.

In some embodiments, the smart gas management platform may fit and obtain a second reference usage quantity curve by connecting all the coordinate points (X, Y1) extracted from the first reference usage quantity curve.

The second reference gas storage quantity curve is a curve plotted based on all the coordinate points (X, Y2) extracted from the first reference gas storage quantity curve, where the difference between the Y1 value and the Y2 value corresponding to the X value in all the coordinate points (X, Y2) is smaller than the difference threshold.

In some embodiments, the second reference gas storage quantity curve is plotted in a similar manner to that of the second reference usage quantity curve, as described above.

The first correlation coefficient is a coefficient that indicates the degree of correlation between the second reference usage quantity curve and the second reference gas storage quantity curve.

In some embodiments, the smart gas management platform may obtain a first correlation coefficient based on the second reference usage quantity curve and the second reference gas storage quantity curve.

The first standard deviation is a degree of dispersion of the data used to measure the data on the second reference gas storage quantity curve. The larger the first standard deviation, the flatter the second reference gas storage quantity curve.

In some embodiments, the smart gas management platform may obtain a first standard deviation based on the second reference gas storage quantity curve by means of a standard deviation algorithm (e.g., a weighting method, etc.).

Step 670, in response to a difference between the Y1 value and the Y2 value corresponding to the X value being greater than a difference threshold, extracting a coordinate point (X, Y1) from the first reference usage quantity curve and a coordinate point (X, Y2) from the first reference gas storage quantity curve, plotting a third reference usage quantity curve based on all extracted coordinate points (X, Y1), plotting a third reference gas storage quantity curve based on all extracted coordinate points (X, Y2), and calculating a second correlation coefficient between the third reference usage quantity curve and the third reference gas storage quantity curve and a second standard deviation of the third reference gas storage quantity curve.

The third reference usage quantity curve is a curve plotted based on all the coordinate points (X, Y1) extracted from the first reference usage quantity curve, where the difference between the Y1 value and the Y2 value corresponding to the X value in all the coordinate points (X, Y1) is more than equal to the difference threshold.

The third reference gas storage quantity curve is a curve plotted based on all the coordinate points (X, Y2) extracted from the first reference gas storage quantity curve, where the difference between the Y1 value and the Y2 value corresponding to the X value in all the coordinate points (X, Y2) is greater than or equal to the difference threshold.

In some embodiments, the plotting manner of the third reference usage quantity curve and the third reference storage quantity curve is similar to that of the second reference usage quantity curve, as described above.

The second correlation coefficient is a coefficient that measures the degree of correlation between the third reference usage quantity curve and the third reference storage curve.

In some embodiments, the smart gas management platform may obtain a second correlation coefficient based on the third reference usage quantity curve and the third reference gas storage quantity curve using the correlation coefficient analysis algorithms such as the Pearson correlation coefficient algorithm or the Chebyshev correlation coefficient algorithm.

The second standard deviation is a measure of the dispersion of the data on the third reference gas storage quantity curve. The larger the second standard deviation, the flatter the third reference gas storage quantity curve.

In some embodiments, the smart gas management platform may obtain a second standard deviation based on the third reference gas storage quantity curve, using a standard deviation algorithm such as a weighting method.

Step 680, calculating a third correlation coefficient between the first reference usage quantity curve and the first reference gas storage quantity curve and a third standard deviation of the first reference gas storage quantity curve.

The third correlation coefficient refers to a degree of correlation between the first reference usage quantity curve and the first reference gas storage quantity curve.

In some embodiments, the smart gas management platform may obtain the third correlation coefficient based on the first reference usage quantity curve and the first reference gas storage quantity curve using a correlation coefficient analysis algorithm (e.g., Pearson correlation coefficient algorithm, Chebyshev correlation coefficient algorithm, etc.).

The third standard deviation measures the dispersion of the data on the first reference gas storage quantity curve. The larger the third standard deviation, the flatter the first reference gas storage quantity curve.

In some embodiments, the smart gas management platform may obtain the third standard deviation based on the first reference gas storage quantity curve using a standard deviation algorithm (e.g., a weighting algorithm, etc.).

Step 690, obtaining a final correlation coefficient based on the first standard deviation, the second standard deviation, and the third standard deviation by determining weights of the three correlation coefficients and summing the weight.

In some embodiments, the larger the standard deviation corresponding to the gas storage quantity curve, the larger the corresponding predetermined weight.

In some embodiments, the smart gas management platform may weight and sum the first standard deviation, the second standard deviation, and the third standard deviation to obtain the final correlation coefficient.

In some embodiments of the present disclosure, the data is segmented based on whether the difference between the Y1 value and the Y2 value exceeds a difference threshold, and then the data is analyzed based on the segmented data separately. The correlation coefficients determined by a weighted summation of the first standard deviation, the second standard deviation, and the third standard deviation, accurately and reasonably reflect the change in gas usage of the historical users and the change in gas storage of the end of the pipeline.

FIG. 7 is another exemplary flowchart for determining a correlation coefficient according to some embodiments of the present disclosure. In some embodiments, the process 700 may be performed by the smart gas management platform of the IoT system 100. As shown in FIG. 7, the process 700 includes Steps 710-760 as follows.

Step 710, determining a third historical usage quantity based on a gas usage quantity of a historical user.

For more information on this step, please refer to step 610 in FIG. 6.

Step 720, fitting the third historical usage quantity to obtain a first reference usage quantity curve.

In some embodiments, the first reference usage quantity curve may include a plurality of reference usage quantity sub-curves. The reference usage quantity sub-curve is one of the curves obtained by dividing the third historical usage quantity into a plurality of sets of data, with each set of data corresponding to the same gas pipeline, and then fitting each set of data.

For more information on this step, please refer to step 620 in FIG. 6.

Step 730, determining a historical gas storage quantity based on the gas storage quantity of the end of the pipeline.

For more information on this step, please refer to step 630 in FIG. 6.

Step 740, fitting the historical gas storage quantity to obtain a first reference gas storage quantity curve.

For more information on this step, please refer to step 640 in FIG. 6.

Step 750, calculating a plurality of sub-correlation coefficients between the plurality of reference usage quantity sub-curves and the first reference gas storage quantity curve, respectively.

The sub-correlation coefficient is a coefficient that measures the correlation between the reference usage quantity sub-curve and the first reference gas storage quantity curve.

In some embodiments, the smart gas management platform may obtain sub-correlation coefficients by correlation coefficient algorithms such as Pearson's correlation coefficient algorithm or Chebyshev correlation coefficient algorithm, based on the reference usage quantity sub-curve and the first reference gas storage quantity curve.

Step 760, weighting and summing the plurality of sub-correlation coefficients to obtain a final correlation coefficient.

In some embodiments, when adding up the weighted sub-correlation coefficients, the weight of each sub-correlation coefficient is determined by the pipeline reliability corresponding to the third historical usage quantity.

The pipeline reliability refers to a degree of reliability with which the pipeline transports gas.

In some embodiments, the pipeline reliability may be measured using pipeline features. In some embodiments, pipeline features may include a pipeline pressure capacity, reliability of pipeline equipment (such as gas regulating stations, gas filters, etc.), pipeline material, pipeline inner diameter, corrosion prevention and leakage control, etc. For example, the higher the pipeline pressure capacity, the higher the reliability of pipeline equipment, the larger the pipeline inner diameter, and the better the corrosion prevention and leakage control, the higher the pipeline reliability.

In some embodiments, the weight of each sub-correlation coefficient is set higher as the pipeline reliability increases. In some embodiments, the smart gas management platform may sort the pipeline reliability corresponding to the plurality of sub-correlation coefficients (for example, from highest to lowest). According to the sorting, the weights of the plurality of sub-correlation coefficients are set in sequence in such a way that the higher the pipeline reliability, the greater the weight setting of the sub-correlation coefficient. When there are a plurality of sub-correlation coefficients with the same pipeline reliability, the plurality of sub-correlation coefficients are set to the same weight.

In some embodiments of the present disclosure, the higher the reliability of the pipeline, the more reliable the gas supply of the pipeline, and the more credible the sub-correlation coefficients obtained by processing the gas usage of the historical users corresponding to that pipeline. Therefore, the accuracy of determining the correlation coefficient is improved by giving a larger weight to that sub-correlation coefficient.

In some embodiments, the smart gas management platform may weight and sum the plurality of sub-correlation coefficients to obtain the final correlation coefficient.

In some embodiments of the present disclosure, due to the significant variation in gas usage of historical users and storage quantity of the end of the pipeline over different historical periods, the sub-correlation coefficients between a plurality of reference usage quantity sub-curves and a first reference gas storage quantity curve may be separately calculated. Then a weighted summation process of a plurality of sub-correlation coefficients is then conducted to obtain a more accurate correlation coefficient between the change in gas usage quantity of historical users and the change in storage quantity of the end of the pipeline.

FIG. 8 is an exemplary flowchart for determining a gas compensation scheme according to some embodiments of the present disclosure. In some embodiments, process 800 may be executed by a smart gas management platform based on the IoT system 100. As shown in FIG. 8, process 800 includes Steps 810-840 as follows.

Step 810, in response to an effective gas storage quantity of an end of a pipeline and a gas gap satisfying a preset condition, determining that a gas compensation scheme includes only a gas storage and transfer quantity of the end of the pipeline.

For a description of the effective gas storage quantity of the end of the pipeline, the gas gap, and the gas storage and transfer quantity of the end of the pipeline, please refer to the related description in FIG. 2.

In some embodiments, the preset condition may be that the effective gas storage quantity of the end of the pipeline is greater than or equal to the gas gap.

In some embodiments, the smart gas management platform may, in response to the effective gas storage quantity of the end of the pipeline being greater than or equal to the gas gap, determine that the gas compensation scheme includes only the gas storage quantity at the end of the pipeline.

Step 820, in response to the effective gas storage quantity of the end of the pipeline and the gas gap not satisfying the preset condition, determining that the gas compensation scheme includes the gas storage and transfer quantity of the end of the pipeline and a gas storage and transfer quantity of at least one gas storage station.

For an explanation of the gas storage quantity of the at least one gas storage station, refer to step 240 of FIG. 2.

In some embodiments, the smart gas management platform may, in response to an effective gas storage quantity at the end of the pipeline being less than the gas gap, determine that the gas compensation scheme includes the gas storage quantity at the end of the pipeline and the gas storage quantity at the at least one gas storage station.

Step 830, generating a candidate gas compensation scheme in response to the gas compensation scheme including the gas storage and transfer quantity of the at least one gas storage station.

The candidate gas compensation scheme refers to a candidate gas storage and transfer quantity scheme identified in response to a gas gap.

In some embodiments, in response to the gas compensation scheme including the gas storage and transfer quantity of at least one gas storage station, the smart gas management platform may combine the gas storage and transfer quantity of the end of the pipeline with the randomly generated gas storage and transfer quantity of at least one gas storage station, and generate at least one gas candidate storage and transfer quantity scheme.

The gas storage and transfer quantity of the end of the pipeline may be equal to the effective gas storage quantity at the end of the pipeline.

The total gas storage and transfer quantity of at least one gas storage station is equal to the difference between the gas gap and the effective gas storage quantity at the end of the pipeline. For an illustration of the effective gas storage quantity at the end of the pipeline, refer to the relevant illustration in step 240 of FIG. 2.

Step 840, determining a target gas compensation scheme based on a cost of the candidate gas compensation scheme.

The cost of the candidate gas compensation scheme refers to a total cost incurred for gas transportation made using the candidate gas compensation scheme.

In some embodiments, the cost of the candidate gas compensation scheme may include transportation costs and/or depreciation costs.

The transportation costs are associated with the process of transporting gas from the storage station to the preset pipeline when a gas transportation is made. The preset pipeline refers to a pipeline capable of receiving gas from the storage station and delivering it to other gas customer terminals.

In some embodiments, the smart gas management platform may calculate transportation costs using the following transportation costs calculation formula:

The transportation cost=ΣTransportation distance of storage station $i$×corresponding unit transportation cost, where $i$ represents different storage station numbers, such as numerical numbers.

The unit transportation cost is a transportation cost per unit quantity of the preset pipeline. The unit transportation cost may be B\$/km/m$^3$. B is predetermined by those skilled in the art based on experience.

The depreciation cost refers to a depreciation cost of pipeline facilities caused by transferring gas to different gas end-users through different branch pipelines.

In some embodiments, the smart gas management platform may calculate depreciation cost using the following depreciation costs calculation formula:

The depreciation cost=gas gap×unit depreciation cost.

The unit depreciation cost is a preset depreciation cost per unit quantity of different branch pipelines which is determined by those skilled in the art based on historical failures of the pipeline, a repair cost, and a pipeline construction cost. The unit depreciation cost may be \$A/m$^3$. A may be any positive number. The pipeline construction cost refers to a cost of constructing the branch pipeline.

In some embodiments of the present disclosure, the accuracy of calculating the cost of the candidate gas compensation scheme may be improved by converting the cost of the candidate gas compensation scheme into quantifiable transportation costs and/or depreciation costs for calculation.

In some embodiments, the smart gas management platform may use the following fourth algorithm to obtain the cost of a candidate gas compensation scheme:

The cost of the candidate gas compensation scheme=the depreciation cost+the transportation cost.

In some embodiments, due to the different distances of different gas storage stations from the preset pipeline and the corresponding transportation quantities, which correspond to different unit transportation costs, the cost of the candidate gas compensation scheme may be related to the distance of at least one gas storage station from the preset pipeline and the corresponding transportation quantity.

The transportation quantity refers to an amount of gas transported by the preset pipeline over a preset time period.

In some embodiments, the further the distance of the at least one gas storage station from the preset pipeline and the more the transportation quantity, the greater the unit transportation cost.

In some embodiments of the present disclosure, due to different distances from the preset pipeline and corresponding transportation quantities, different gas storage stations correspond to different per unit transportation costs. Setting the cost of the candidate gas compensation scheme to correlate with the distance of the at least one gas storage station from the preset pipeline and the corresponding transportation quantity may further improve the accuracy of the cost of the candidate gas compensation scheme obtained by the calculation.

In some embodiments, after the gas storage station converts the natural gas into liquefied natural gas (LNG) or compressed natural gas (CNG), the liquefied natural gas (LNG) or compressed natural gas (CNG) is delivered to the gas terminal-users. Before it is delivered to the gas terminal-users through a preset pipeline, it needs to be converted back to natural gas, so the cost of the candidate gas compensation scheme may also include a gasification cost.

The gasification cost refers to a cost of converting liquefied gas of a storage station into gaseous gas. The gasification cost may be C$/m$^3$. C may be any positive number and may be predetermined by those skilled in the art based on experience.

In some embodiments, the smart gas management platform may obtain the gasification cost using the following gasification cost calculation formula:

The gasification cost=quantity of liquefied gas in the storage station×unit gasification cost.

The unit gasification cost refers to a cost of converting a unit quantity of liquefied gas into gasified gas.

The total quantity of liquefied gas in the storage station may be obtained through a gas flow meter.

In some embodiments, the smart gas management platform may also use a fifth algorithm to calculate the cost of the candidate gas compensation scheme as follows.

The cost of the candidate gas compensation scheme is equal to the depreciation cost, the transportation cost, and the gasification cost.

In some embodiments of the present disclosure, considering the gasification cost in the process of calculating the cost of the candidate gas compensation scheme may further enhance the accuracy of calculating the cost of the candidate gas compensation scheme.

The target gas compensation scheme is the selected candidate gas compensation scheme.

In some embodiments, the smart gas management platform may choose the candidate gas compensation scheme with the lowest cost as the target gas compensation scheme.

In some embodiments of the present disclosure, the effective gas storage quantity of the end of the pipeline does not require transportation, the cost is lower than the of cost the gas storage and transfer quantity of the gas storage station. In the process of determining the target gas compensation scheme, priority is given to using the effective gas storage quantity of the end of the pipeline for the future preset period for compensated. If the effective gas storage quantity of the end of the pipeline for the future preset period is insufficient, the gas storage and transfer quantity of different gas storage stations will be used for compensation, so that the target gas compensation scheme can minimize the operating cost while meeting user needs and safety.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

What is claimed is:

1. A method for determining a gas compensation scheme based on smart gas, wherein the method is implemented by a smart gas management platform based on an Internet of Things system for determining a gas compensation scheme based on smart gas, comprising:

determining, based on a planned gas supply quantity of a gas supplier, a predicted gas supply quantity for a future preset time period using a preset manner;

predicting a gas demand quantity for the future preset time period based on a gas usage quantity of a historical user;

predicting a gas supply deviation rate of the gas supplier by a deviation rate prediction model based on a gas pipeline design map, weather information for the future preset time period, and the gas demand quantity for the future preset time period, the deviation rate prediction model being a machine learning model;

determining a gas supply quantity for the future preset time period based on the predicted gas supply quantity and the gas supply deviation rate;

determining a gas gap for the future preset time period based on the gas supply quantity and the gas demand quantity; and determining the gas compensation scheme based on the gas gap, operational requirements of an end of a pipeline, and operational parameters of the end of the pipeline, wherein:

the deviation rate prediction model includes a pipeline feature extraction layer and a deviation rate prediction layer, the pipeline feature extraction layer is configured to process the gas pipeline design map to determine a pipeline feature map, and the deviation rate prediction layer is configured to process the pipeline feature map, the weather information for the future preset time period, and the gas demand quantity for the future preset time period to determine the gas supply deviation rate of the gas supplier;

the deviation rate prediction model is obtained by jointly training of the pipeline feature extraction layer and the deviation rate prediction layer based on samples and labels, the samples include historical sample gas pipeline design maps for at least one historical sample area, weather information for a historical sample time period, and a gas demand quantity for the historical sample time period, and labels include a historical sample gas deviation rate corresponding to the historical sample area of the historical sample time period; wherein the jointly training includes:

inputting the historical sample gas pipeline design maps into an initial pipeline feature extraction layer and obtaining an output of the initial pipeline feature extraction layer, wherein the output of the initial pipeline feature extraction layer includes a pipeline feature map that reflects features of gas pipelines, the pipeline feature map includes nodes and edges, the nodes represent gas pipelines, node attributes of the nodes reflect relevant features of corresponding gas pipelines, the node attributes include reliability of the pipelines and a standard flow rate interval of the pipelines, the edges represent that the gas pipelines are adjacent and connected, edge attributes of the edges reflect relevant features of corresponding pathways, and the edge attributes include a degree of bending at a node connection;

inputting the weather information for the historical time period, the gas demand quantity for the historical time period, and the output of the initial pipeline feature extraction layer into an initial deviation rate prediction layer and obtaining an output of the initial deviation rate prediction layer, wherein the output of the initial deviation rate prediction layer includes a gas supply deviation rate of the gas supplier, and the gas supply deviation rate of the gas supplier is a degree of deviation between a quantity of gas actually supplied by the gas supplier to an entire preset area and the predicted gas supply quantity for the future preset time period;

constructing a loss function based on the output of the initial deviation rate prediction layer and the labels;

updating parameters of the initial pipeline feature extraction layer and the initial deviation rate prediction layer iteratively based on the loss function until meeting a preset condition; and obtaining the deviation rate prediction model.

2. The method of claim 1, wherein the predicting a gas demand quantity for the future preset time period based on a gas usage quantity of a historical user includes:

determining a first historical usage quantity based on the gas usage quantity of the historical user; wherein the first historical usage quantity is a gas usage quantity of the historical user at a target historical time period, and the target historical time period is a historical time period corresponding to the future preset time period;

fitting the first historical usage quantity to obtain a first straight line;

determining, based on the first straight line, a second historical usage quantity; wherein the second historical usage quantity is a gas usage quantity in the first historical usage quantity for which a distance from the first straight line satisfies a preset distance condition;

fitting the second historical usage quantity to obtain a second straight line; and predicting the gas demand quantity for the future preset time period based on the second straight line.

3. The method of claim 1, wherein the IoT system further includes a smart gas user platform, a smart gas service platform, a smart gas sensing network platform, and a smart gas object platform; and the method further comprises:

sending a gas operation and management information query instruction to the smart gas service platform through the smart gas user platform, and receiving gas operation and management information uploaded by the smart gas service platform, wherein the smart gas user platform is configured as a terminal device;

obtaining the gas operation and management information from a smart gas data center of the smart gas management platform through the smart gas service platform, and sending the gas operation and management information to the smart gas user platform, wherein the smart gas management platform is configured to perform an information interaction with the smart gas service platform and the smart gas sensing network platform through the smart gas data center of the smart gas management platform, respectively;

receiving the gas operation and management information query instruction issued by the smart gas service platform through the smart gas data center of the smart gas management platform, uploading the gas operation and management information to the smart gas service platform; issuing an instruction for obtaining gas equipment-related data to the smart gas sensing network platform, and receiving gas equipment-related data uploaded by the smart gas sensing network platform;

receiving the instruction for obtaining gas equipment-related data issued by the smart gas data center of the smart gas management platform through the smart gas sensing network platform, uploading the gas equipment-related data to the smart gas data center of the smart gas management platform; receiving the gas equipment-related data uploaded by the smart gas object platform, and issuing the instruction for obtaining gas equipment-related data to the smart gas object platform; and receiving the instruction for obtaining gas equipment-related data issued by the smart gas sensing network platform through the smart gas object platform and uploading the gas equipment-related data to the smart gas sensing network platform, wherein the smart gas object platform is configured as a variety of gas and monitoring devices.

4. The method of claim 2, wherein the preset distance condition is related to a data percentage of the gas usage quantity that satisfies the preset distance condition.

5. The method of claim 1, wherein the gas compensation scheme includes a gas storage and transfer quantity of the end of the pipeline and/or a gas storage and transfer quantity of at least one gas storage station; and wherein the determining the gas compensation scheme based on the gas gap, operational requirements of an end of a pipeline, and operational parameters of the end of the pipeline includes:

determining an effective gas storage quantity of the end of the pipeline for the future preset time period based on the operational requirements of the end of the pipeline and the operational parameters of the end of the pipeline; and determining the gas compensation scheme based on the effective gas storage quantity of the end of the pipeline and the gas gap.

6. The method of claim 5, wherein the operational parameters of the end of the pipeline include a gas storage quantity of the end of the pipeline, and the future preset time period includes a plurality of future sub-time periods;

wherein the determining an effective gas storage quantity of the end of the pipeline for the future preset time period based on the operational requirements of the end of the pipeline and the operational parameters of the end of the pipeline includes:

determining a correlation coefficient based on the gas storage quantity of the end of the pipeline and the gas usage quantity of the historical user, the correlation coefficient characterizing correlation between a change in the gas usage quantity of the historical user and a change in the gas storage quantity of the end of the pipeline;

determining the gas storage quantity of the end of the pipeline for the future preset time period based on the gas storage quantity of the end of the pipeline, the correlation coefficient, and a predicted gas demand quantity for the future sub-time periods; and determining the effective gas storage quantity of the end of the pipeline for the future preset time period by using a preset rule based on the gas storage quantity of the end of the pipeline for the future preset time period and the operational requirements of the end of the pipeline.

7. The method of claim 6, wherein the determining a correlation coefficient based on the gas storage quantity of the end of the pipeline and the gas usage quantity of the historical user includes:

determining a third historical usage quantity based on the gas usage quantity of the historical user; wherein the third historical usage is a gas usage quantity of the historical user at a target historical time period, and the target historical time period is historical time period corresponding to the future preset time period;

fitting the third historical usage quantity to obtain a first reference usage quantity curve, the first reference usage quantity curve including a plurality of reference usage quantity sub-curves;

determining a historical gas storage quantity based on the gas storage quantity of the end of the pipeline; wherein the historical gas storage quantity is a gas storage quantity of the end of the pipeline of the historical user at the target historical time period;

fitting the historical gas storage quantity to obtain a first reference gas storage quantity curve;

calculating a plurality of sub-correlation coefficients between the plurality of reference usage quantity sub-curves and the first reference gas storage quantity curve, respectively; and weighting and summing the plurality of sub-correlation coefficients to obtain a final correlation coefficient.

8. The method of claim 7, wherein when the weighting and summing the plurality of sub-correlation coefficients is processed, weights of the sub-correlation coefficients correlate to reliability of a pipeline corresponding to the third historical usage quantity.

9. The method of claim 5, wherein the determining the gas compensation scheme based on the effective gas storage quantity of the end of the pipeline and the gas gap includes:

in response to the effective gas storage quantity of the end of the pipeline and the gas gap satisfying a preset condition, determining that the gas compensation scheme includes only the gas storage and transfer quantity of the end of the pipeline;

in response to the effective gas storage quantity of the end of the pipeline and the gas gap not satisfying the preset condition, determining that the gas compensation scheme includes the gas storage and transfer quantity of the end of the pipeline and the storage and transfer quantity of the at least one gas storage station;

generating a candidate gas compensation scheme in response to the gas compensation scheme including the gas storage and transfer quantity of the at least one gas storage station; and determining a target gas compensation scheme based on a cost of the candidate gas compensation scheme.

10. The method of claim 9, wherein the cost of the candidate gas compensation scheme includes a transportation cost or a depreciation cost.

11. The method of claim 9, wherein the cost of the candidate gas compensation scheme is related to a distance of the at least one gas storage station from a preset pipeline and a transportation quantity corresponding to the candidate gas compensation scheme.

12. The method of claim 9, wherein the cost of the candidate gas compensation scheme further includes a gasification cost.

13. An Internet of Things (IoT) system for determining a gas compensation scheme based on smart gas, wherein the IoT system comprises a smart gas management platform; and the smart gas management platform is configured to:

determine, based on a planned gas supply quantity of a gas supplier, a predicted gas supply quantity for a future preset time period using a preset manner;

predict a gas demand quantity for the future preset time period based on a gas usage quantity of a historical user;

predict a gas supply deviation rate of the gas supplier by a deviation rate prediction model based on a gas pipeline design map, weather information for the future preset time period, and the gas demand quantity for the future preset time period, the deviation rate prediction model being a machine learning model;

determine a gas supply quantity for the future preset time period based on the predicted gas supply quantity and the gas supply deviation rate;

determine a gas gap for the future preset time period based on the gas supply quantity and the gas demand quantity; and determine the gas compensation scheme based on the gas gap, operational requirements of an end of a pipeline, and operational parameters of the end of the pipeline, wherein:

the deviation rate prediction model includes a pipeline feature extraction layer and a deviation rate prediction layer, the pipeline feature extraction layer is configured to process the gas pipeline design map to determine a pipeline feature map, and the deviation rate prediction layer is configured to process the pipeline feature map, the weather information for the future preset time period, and the gas demand quantity for the future preset time period to determine the gas supply deviation rate of the gas supplier;

the deviation rate prediction model is obtained by jointly training of the pipeline feature extraction layer and the deviation rate prediction layer based on samples and labels, the samples include historical sample gas pipeline design maps for at least one historical sample area, weather information for a historical sample time period, and a gas demand quantity for the historical sample time period, and labels include a historical sample gas deviation rate corresponding to the historical sample area of the historical sample time period; wherein the jointly training includes:

inputting the historical sample gas pipeline design maps into an initial pipeline feature extraction layer and obtaining an output of the initial pipeline feature extraction layer, wherein the output of the initial pipeline feature extraction layer includes a pipeline feature map that reflects features of gas pipelines, the pipeline feature map includes nodes and edges, the nodes represent gas pipelines, node attributes of the nodes reflect relevant features of corresponding gas pipelines, the node attributes include reliability of the pipelines and a standard flow rate interval of the pipelines, the edges represent that the gas pipelines are adjacent and connected, edge attributes of the edges reflect relevant features of corresponding pathways, and the edge attributes include a degree of bending at a node connection;

inputting the weather information for the historical time period, the gas demand quantity for the historical time period, and the output of the initial pipeline feature extraction layer into an initial deviation rate prediction layer and obtaining an output of the initial deviation rate prediction layer, wherein the output of the initial deviation rate prediction layer includes a gas supply deviation rate of the gas supplier, and the gas supply deviation rate of the gas supplier is a degree of deviation between a quantity of gas actually supplied by the gas supplier to an entire preset area and the predicted gas supply quantity for the future preset time period;

constructing a loss function based on the output of the initial deviation rate prediction layer and the labels;

updating parameters of the initial pipeline feature extraction layer and the initial deviation rate prediction layer iteratively based on the loss function until meeting a preset condition; and obtaining the deviation rate prediction model.

14. The IoT system of claim 13, wherein the smart gas management platform is further configured to:

determine a first historical usage quantity based on the gas usage quantity of the historical user; wherein the first historical usage quantity is a gas usage quantity of the historical user at a target historical time period, and the target historical time period is a historical time period corresponding to the future preset time period;

fit the first historical usage quantity to obtain a first straight line; and determine, based on the first straight line, a second historical usage quantity; wherein the second historical usage quantity is a gas usage quantity in the first historical usage quantity for which a distance from the first straight line satisfies a preset distance condition;

fit the second historical usage quantity to obtain a second straight line; and predict the gas demand quantity for the future preset time period based on the second straight line.

15. The IoT system of claim 13, wherein the IoT system further comprises a smart gas user platform, a smart gas service platform, a smart gas sensing network platform and a smart gas object platform;

the smart gas user platform is configured to send a gas operation and management information query instruction to the smart gas service platform, and receive gas operation and management information uploaded by the smart gas service platform, wherein the smart gas user platform is configured as a terminal device;

the smart gas service platform is configured to obtain the gas operation and management information from a smart gas data center of the smart gas management platform, and send the gas operation and management information to the smart gas user platform;

the smart gas management platform is configured to perform an information interaction with the smart gas service platform and the smart gas sensing network platform through the smart gas data center of the smart gas management platform, respectively, receive the gas operation and management information query instruction issued by the smart gas service platform through the smart gas data center of the smart gas management platform, upload the gas operation and management information to the smart gas service platform; issue an instruction for obtaining gas equipment-related data to the smart gas sensing network platform, and receive gas equipment-related data uploaded by the smart gas sensing network platform;

the smart gas sensing network platform is configured to receive the instruction for obtaining gas equipment-related data issued by the smart gas data center of the smart gas management platform, upload the gas equipment-related data to the smart gas data center of the smart gas management platform; receive the gas equipment-related data uploaded by the smart gas object platform, and issue the instruction for obtaining gas equipment-related data to the smart gas object platform; and the smart gas object platform is configured to receive the instruction for obtaining gas equipment-related data issued by the smart gas sensing network platform and upload the gas equipment-related data to the smart gas sensing network platform, wherein the smart gas object platform is configured as a variety of gas and monitoring devices.

16. The IoT system of claim 13, wherein the gas compensation scheme includes a gas storage and transfer quantity of the end of the pipeline and/or a gas storage and transfer quantity of at least one gas storage station; and the smart gas management platform is further configured to:

determine an effective gas storage quantity of the end of the pipeline for the future preset time period based on the operational requirements of the end of the pipeline and the operational parameters of the end of the pipeline; and determine the gas compensation scheme based on the effective gas storage quantity of the end of the pipeline and the gas gap.

17. The IoT system of claim 16, wherein the operational parameters of the end of the pipeline include a gas storage quantity of the end of the pipeline, and the future preset time period includes a plurality of future sub-time periods; and the smart gas management platform is further configured to:

determine a correlation coefficient based on the gas storage quantity of the end of the pipeline and the gas usage quantity of the historical user, the correlation coefficient characterizing correlation between a change in the gas usage quantity of the historical user and a change in the gas storage quantity of the end of the pipeline;

determine the gas storage quantity of the end of the pipeline for the future preset time period based on the gas storage quantity of the end of the pipeline, the correlation coefficient, and a predicted gas demand quantity for the future sub-time periods; and determine the effective gas storage quantity of the end of the pipeline for the future preset time period by using a preset rule based on the gas storage quantity of the end of the pipeline for the future preset time period and the operational requirements of the end of the pipeline.

18. The IoT system of claim 17, wherein the smart gas management platform is further configured to:

determine a third historical usage quantity based on the gas usage quantity of the historical user; wherein the third historical usage is a gas usage quantity of the historical user at a target historical time period, and the target historical time period is historical time period corresponding to the future preset time period;

fit the third historical usage quantity to obtain a first reference usage quantity curve, the first reference usage quantity curve including a plurality of reference usage quantity sub-curves;

determine a historical gas storage quantity based on the gas storage quantity of the end of the pipeline; wherein the historical gas storage quantity is a gas storage quantity of the end of the pipeline of the historical user at the target historical time period;

fit the historical gas storage quantity to obtain a first reference gas storage quantity curve;

calculate a plurality of sub-correlation coefficients between the plurality of reference usage quantity sub-curves and the first reference gas storage quantity curve, respectively; and weight and sum the plurality of sub-correlation coefficients to obtain a final correlation coefficient.

19. The IoT system of claim 16, wherein the smart gas management platform is further configured to:

in response to the effective gas storage quantity of the end of the pipeline and the gas gap satisfying a preset condition, determine that the gas compensation scheme includes only the gas storage and transfer quantity of the end of the pipeline;

in response to the effective gas storage quantity of the end of the pipeline and the gas gap not satisfying the preset condition, determine that the gas compensation scheme includes the gas storage and transfer quantity of the end of the pipeline and the storage and transfer quantity of the at least one gas storage station;

generate a candidate gas compensation scheme in response to the gas compensation scheme including the gas storage and transfer quantity of the at least one gas storage station; and determine a target gas compensation scheme based on a cost of the candidate gas compensation scheme.

20. A non-transitory computer-readable storage medium, storing computer instructions, wherein when reading the computer instructions in the storage medium, a computer executes the method for determining a gas compensation scheme based on smart gas of claim 1.

* * * * *